United States Patent
Huang et al.

(10) Patent No.: US 11,573,106 B2
(45) Date of Patent: Feb. 7, 2023

(54) MULTI-MODAL FIELD-PROGRAMMABLE METAMORPHIC SENSOR AND SIGNAL ACQUISITION SYSTEM

(71) Applicant: HUAZHONG UNIVERSITY OF SCIENCE AND TECHNOLOGY, Hubei (CN)

(72) Inventors: Yongan Huang, Hubei (CN); Chen Zhu, Hubei (CN); Wennan Xiong, Hubei (CN); Yunzhao Bai, Hubei (CN); Zhaoxi Yang, Hubei (CN); Zhouping Yin, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 262 days.

(21) Appl. No.: 17/035,671

(22) Filed: Sep. 28, 2020

(65) Prior Publication Data
US 2021/0181002 A1   Jun. 17, 2021

(30) Foreign Application Priority Data
Dec. 17, 2019 (CN) .......................... 201911303237.6

(51) Int. Cl.
| | | |
|---|---|---|
| *G01D 21/02* | (2006.01) | |
| *G01L 1/22* | (2006.01) | |
| *H04R 17/02* | (2006.01) | |

(52) U.S. Cl.
CPC ............ *G01D 21/02* (2013.01); *G01L 1/2262* (2013.01); *H04R 17/025* (2013.01)

(58) Field of Classification Search
CPC .......... G01D 21/02; G01D 5/185; G01D 5/12; G01D 5/14; G01D 5/18; G01L 1/00; G01L 1/16; G01L 1/20; G01L 1/205; G01L 1/22; G01L 1/225; G01L 1/2262; G01L 5/00; G01L 5/0028; G01L 5/0014;
(Continued)

(56) References Cited

U.S. PATENT DOCUMENTS

| | | | | |
|---|---|---|---|---|
| 9,281,415 | B2 * | 3/2016 | Bao | ........................ G01L 1/148 |
| 10,473,539 | B2 * | 11/2019 | Podoloff | ................. G01L 1/205 |
| 10,928,947 | B2 * | 2/2021 | Micci | .................. G06F 3/04144 |

FOREIGN PATENT DOCUMENTS

| | | | | |
|---|---|---|---|---|
| CN | 107462350 A | * | 12/2017 | ............... G01L 1/16 |
| EP | 2031362 A1 | * | 3/2009 | ............. A61B 5/447 |
| WO | WO-02103436 A2 | * | 12/2002 | ......... G02F 1/13338 |

* cited by examiner

*Primary Examiner* — Daniel R Miller
*Assistant Examiner* — Eric Sebastian Von Wald
(74) *Attorney, Agent, or Firm* — JCIP Global Inc.

(57) ABSTRACT

A multi-modal field-programmable metamorphic sensor is provided. The metamorphic sensor has a multi-layer structure, including an upper electrode layer, a spacer layer, and a lower electrode layer. At least one of the upper electrode layer and the lower electrode layer is a sensor A. The spacer layer is disposed between the electrode layers. A sensor B is formed through forming a structure of electrode layer-spacer layer-electrode layer structure. When detecting an object, the measurement of different physical quantities of different objects is implemented through switching between the sensor A and the sensor B. The sensor serves as a single cell. Multiple single cells are combined to form a multi-cell sensor. A signal acquisition system for acquiring signal of the sensor is also provided.

13 Claims, 21 Drawing Sheets

(58) Field of Classification Search
CPC ... G01L 9/0022; G01L 23/222; G01F 1/8436; G01N 2201/12; G01N 29/44; G01R 31/31723; G01R 27/2605; G02F 1/133394; G06K 7/10653; G10H 2230/025; G10H 2220/525; G05B 2219/21126; G05B 2219/40536; G05B 2219/1161; G05B 2219/1176; G05B 2219/34002; G05B 2219/1163; G05B 2219/37284; G05B 2219/21087; H03K 3/14; H03K 3/0234; H03K 3/038; H03K 3/3568; H03K 3/00; H04R 17/00; H04R 17/025; H04B 10/299; H04Q 2213/00; H04L 12/2892; H01J 31/06; H01J 2237/20264; H03F 2200/252; H01L 27/2463; H01L 45/04; H01H 2215/052; H03H 9/562; H03H 9/581; H03H 9/178

See application file for complete search history.

MULTI-MODAL FIELD-PROGRAMMABLE METAMORPHIC SENSOR AND SIGNAL ACQUISITION SYSTEM

CROSS-REFERENCE TO RELATED APPLICATION

This application claims the priority benefit of China application serial no. 201911303237.6, filed on Dec. 17, 2019. The entirety of the above-mentioned patent application is hereby incorporated by reference herein and made a part of this specification.

BACKGROUND

Technical Field

The disclosure relates to the field of metamorphic sensors, and more particularly relates to a multi-modal field-programmable metamorphic sensor and a signal acquisition system.

Description of Related Art

With the development of flexible electronics and sensor technology, which is widely applied to the fields of flexible bio-integrated electronics, aircraft smart skin, robot electronic skin, epidermal electronics, etc., the requirements for function diversification, high-density integration, high robustness, in-situ perception-excitation integration, etc. of metamorphic sensor systems are becoming higher and higher. The continuous fusion of different sensor modules and execution excitation modules is required to form complex multi-functional flexible electronic systems. For example, the aircraft smart skin needs to make use of flexible skin to implement in-situ pressure, temperature, and wind velocity measurement on the surface of the aircraft. Also, crack diagnosis and electromagnetic wave absorption need to be performed for aircraft stealth and other functions. The robot electronic skin needs to implement in-situ tactile perception functions (i.e. perceptions of temperature, compressive stress, shear stress in two directions, humidity, strain, distance from surrounding objects, etc.) on the electronic skin. The flexible bio-integrated electronics applied to biological health monitoring or adjuvant therapy need to perform in-situ perception of potential distribution of organism, temperature and humidity, movement state of organs, blood glucose, blood oxygen, salt ions, lactic acids, and other content distribution in the body fluid. The fields involved for the flexible electronic applications are all developing toward the direction of flexible structure, diversified function, sensor-actuator integration, high integration, and complex circuitry.

With the continuous increase in the number, higher and higher integration, and more and more functions of sensor and excitation modules, the complexity of the preparation process of the metamorphic sensor has increased significantly, the contradiction between the density and integration of sensor modules has intensified, the number of circuit ports and lead wires of the sensor is also continuously increasing, the ratio of the number of functions to the number of device structural layers is low, and the system resource burden for the metamorphic sensor to implement all the functions is high. At present, the main integration method is to combine different sensor modules (including various types of sensor modules, such as visual sensor, optical sensor, temperature and humidity sensor, stress and strain sensor, etc.), excitation modules (including electrical signal excitation, inverse piezoelectric effect excitation, optical excitation, magnetic excitation, thermal excitation, and other different types of excitation forms), and acquisition circuit modules by tiling in the planar direction and superimposing in the vertical direction, which cannot implement the requirements of high integration and multi-functional flexible electronic sensor system. For example, the tactile function of the robot electronic skin needs to distribute sensors of different functions according to a specific density, so a large number of arrayed stress, strain, temperature, humidity, and distance sensors, etc. are distributed on the electronic skin. Each sensor needs to be arranged according to a specific density. In order to implement the tactile function of human skin, the density of stress sensors needs to be $160/cm^2$, the density of temperature sensors need to be $8/cm^2$, and at least more than 168 sensor units need to be integrated in 1 $cm^2$ of electronic skin. For the robot to have a super electronic skin that exceeds the sensitivity and functions of human skin, the scale of sensors will increase significantly. In addition, each unit is an independent sensor module, and the occupied space and the number of interfaces and lead wires need to be not interfering with one another, which will result in a huge number of ports and lead wires required by the device.

The functions of most existing sensors are relatively unitary. Multi-functional metamorphic sensors are usually implemented by superimposing several layers of distributive various functional module units. The arrangement of current multi-modal sensor units has a common defect: total number of ports and lead wires of the sensor unit is the sum of the number of ports and lead wires of each sensor unit. Therefore, in high-density integration, a large amount of hardware resources is occupied and the layout of the wiring is very difficult. The measurement range or accuracy of one sensor is limited. Multiple sensors often need to work together to expand the range or improve accuracy. In addition, one sensor has only one function, and it is difficult to determine whether the measurement result is accurate. Also, once the sensor is damaged, the corresponding function is lost and cannot be replaced by other sensors, thereby resulting in reduced reliability of the sensor.

SUMMARY

The disclosure provides a multi-modal field-programmable metamorphic sensor and a signal acquisition system, which enable the sensor to work in different functional modalities through the design of an upper electrode layer, a spacer layer, and a lower electrode layer and changing the electrode connection of the metamorphic sensor through the programmable logic control of a variable topology switch, so that the metamorphic sensor can implement a high degree of integration of multiple sensors. On the one hand, the issue of having many lead wires by using multiple sensors is solved. On the other hand, the measurement accuracy and the measurement efficiency are improved while the measurement costs are reduced. The single metamorphic sensor has many completely different functions and can be switched in real time according to the programmed code.

An aspect of the disclosure provides a multi-modal field-programmable metamorphic sensor. The metamorphic sensor has a multi-layer structure. The multi-layer structure includes an upper electrode layer, a spacer layer, and a lower electrode layer. At least one of the upper electrode layer and the lower electrode layer is a sensor A. The spacer layer is disposed between the electrode layers. A sensor B is formed through forming a structure of electrode layer-spacer layer-electrode layer structure. When detecting an object, the measurement of different physical quantities of different objects is implemented through switching between the sensor A and the sensor B. In addition, the sensor serves as a single cell. Multiple single cells are combined to form a multi-cell sensor.

Usually, the electrode layers can act as much more than one sensor. And the spacer layer usually exhibits more than one physical effect, so that it can act as various sensors when combined with the electrode layers. Further preferably, the upper electrode layer serves as a first electrode. The lower electrode layer serves as a third electrode. The spacer layer includes a dielectric layer and a piezoelectric layer. A second electrode is further disposed between the dielectric layer and the piezoelectric layer. The dielectric layer is disposed between the first electrode layer and the second electrode. The piezoelectric layer is disposed between the second electrode and the third electrode layer. The first electrode, the dielectric layer, and the second electrode form a capacitive sensor. The second electrode, the piezoelectric layer, and the third electrode form a piezoelectric sensor.

The second electrode includes two resistors, which are respectively a first resistor and a second resistor. The first resistor is bent into a sensitive grating structure, so as to extend the length of the resistor. The second resistor is distributed in parallel with the first resistor. Two ends of the first resistor are disposed with terminals A and F. A terminal of the second resistor is disposed with a terminal D. The first resistor forms a resistance sensor, for reflecting the change in resistance through monitoring the resistance between the terminals A and F. The first resistor and the second resistor collectively form a capacitance sensor, for reflecting the change in capacitance through monitoring the capacitance between the terminals A/F and D.

The third electrode includes two resistors with different thermoelectric coefficients, which are respectively a third resistor and a fourth resistor. The third resistor has a sensitive metallic foil grating structure. The fourth resistor is connected to the third resistor and a thermocouple is formed at the connection point. Two ends of the third resistor are disposed with terminals B and E. A terminal of the fourth resistor is disposed with a terminal C. The third resistor forms a resistance sensor, for reflecting the change in resistance through monitoring the resistance between the terminals B and C. The third resistor and the fourth resistor collectively form a thermocouple sensor, for reflecting the change in thermocouple through monitoring the thermopotential between the terminals B/E and C.

Further preferably, the upper electrode layer preferably adopts an electromagnetic wave absorbing material for absorbing electromagnetic wave.

The materials of the first resistor and the second resistor are the same, which is preferably a material with a strain sensitivity coefficient greater than 1.6, a resistivity greater than 0.25 $\mu\Omega\cdot mm$, and a temperature coefficient of resistance less than $40\times10^{-6}/°$ C. The sensitivity coefficient is high and kept constant, so that the first resistor is sensitive to strain. The resistivity is large to improve the signal-to-noise ratio and reduce the influence of resistance of a lead wire. The temperature coefficient of resistance is small to reduce the sensitivity of the first resistor to temperature, so as to ensure that the first resistor only has high sensitivity to change in strain.

The material of the third resistor is preferably a material with a temperature coefficient of resistance greater than $3000\times10^{-6}/°$ C., and the material of the fourth resistor is preferably a material with a thermopotential greater than 5 $\mu V/°$ C. to the third resistor, so that the third resistor constitutes a resistance temperature detector (RTD), and the third and fourth resistors constitute a thermocouple temperature sensor to satisfy temperature measurements of different temperature ranges.

The thickness of the metamorphic sensor is preferably 20 $\mu m$ to 30 $\mu m$.

Required patterns of the first electrode, the second electrode, and the third electrode are obtained through sequentially photolithography technology, and then the first electrode, the second electrode, and the third electrode with specific patterns are obtained on the mask of shaped photoresist via magnetron sputtering or vacuum evaporation of corresponding metallic materials.

The first resistor is further connected to an additional resistor to increase the area coverage of the third electrode.

Further preferably, the metamorphic sensor further includes a substrate. The spacer layer is a piezoelectric layer. The substrate is a carrier of the upper electrode layer, the lower electrode layer, and the piezoelectric layer.

The upper electrode layer and the lower electrode layer have the same structure. The upper/lower electrode layer includes three electrode parts. A first electrode part is connected at two ends to form a closed serpentine structure, which is disposed with a first terminal. A second part and a third part have the same structure, which is a sensitive grating shape distributed at two sides of the first terminal. The included angle between the second part and the third part is 90 degrees. One ends of both the second part and the third part are connected to the first terminal, and the other ends are respectively disposed with a second terminal and a third terminal. The piezoelectric layer is disposed between the upper electrode layer and the lower electrode layer. The piezoelectric layer and the first electrode part have the same structure.

When measuring the resistance between the first terminal and the second terminal or the resistance between the first terminal and the third terminal of the upper/lower electrode layer, the upper/lower electrode layer serves as a resistance sensor. When measuring the voltage or capacitance between the first terminal on the upper electrode layer and the first terminal on the lower electrode layer, the sensor respectively serves as a piezoelectric sensor and a capacitive sensor.

Further preferably, both the first electrode part and the piezoelectric layer are disposed with multiple micropores with a pore diameter of 100 nm to 1 $\mu m$. When gaseous water molecules enter the pores, the dielectric constant of the piezoelectric layer is changed, thereby changing the capacitance between the upper electrode layer and the lower electrode layer. The materials of both the upper electrode layer and the lower electrode layer are gold, platinum, silver, titanium, niobium, or tantalum, and the materials of the upper electrode layer and the lower electrode layer are different. The material of the piezoelectric layer is preferably barium titanate, sodium bismuth titanate, potassium sodium niobate, barium strontium niobate, barium sodium niobate, bismuth titanate, calcium bismuth titanate, or strontium bismuth titanate. The material of the substrate is preferably polyimide (PI), polyethylene terephthalate (PET), polyurethane (PU), or polydimethylsiloxane (PDMS). The thickness of the upper electrode layer is preferably 100 nm to 200 nm, and the thickness of the lower electrode layer is preferably 100 nm to 200 nm.

Further preferably, the metamorphic sensor further includes a bottom flexible substrate, a conductive electrode, and a top flexible substrate. The upper electrode layer serves as a top electrode. The lower electrode layer serves as a bottom electrode. The spacer layer is an intermediate dielectric layer.

The bottom electrode is disposed on the bottom flexible substrate. Flexible films with multiple hierarchical microstructures acts as the intermediate dielectric layer. The top electrode layer includes two flat electrodes. Each electrode is disposed with a lead wire. Terminals of the lead wires on the two flat electrodes are relatively disposed to form a notch. The conductive electrode is disposed on the flexible protrusions, and is disposed right under the notch.

When the conductive electrode is not embedded in the notch, the two electrodes on the top electrode layer form capacitance. Through measuring the capacitance changes between the two electrodes on the top film, the environmental changes, such as objects proximity, can be monitored.

When the top flexible substrate is subjected to a downward external force, the top electrode moves downward, the conductive electrode is embedded in the notch, and the two flat electrodes are conducted to form resistance. When the external environment causes the change of resistance, the change in the external environment, such as temperature, is reflected through quantifying the resistance values. At the same time, when the two flat electrodes are conducted to form resistance, the entire top electrode serves as a flat one new electrode, the new top electrode and the bottom electrode form a top electrode-bottom electrode capacitor sensor. Therefore, the capacitance device can be utilized to sensing the external environment, such as contact force.

Further preferably, the metamorphic sensor further includes a substrate and a piezoelectric layer. The substrate is disposed below the piezoelectric layer, and is a carrier of the piezoelectric layer. The piezoelectric layer is disposed below the bottom flexible substrate, and includes a piezoelectric material layer and an electrode layer. The piezoelectric material layer is configured to sense pressure and convert the sensed pressure into electric charge. The electrode layer is configured to transmit the electric charge. The electrode layer is disposed with two sets of orthogonal interdigital transducers. Each set of orthogonal interdigital transducers includes a pair of lateral interdigital transducers and a pair of longitudinal interdigital transducers.

Further preferably, the material of the bottom flexible substrate is preferably PDMS or platinum-catalyzed silicone rubber Ecoflex. The material of the bottom electrode is preferably Cu, Au or other some metals with good conductivity. The material of the intermediate dielectric layer is preferably PDMS or platinum-catalyzed silicone rubber Ecoflex. The material of the conductive electrode layer is preferably conductive silver paste. The material of the top electrode is preferably Cu, Au or other some metals with good conductivity. The material of the top flexible substrate is preferably PDMS or platinum-catalyzed silicone rubber Ecoflex.

The thickness of the bottom flexible substrate is preferably 10 μm to 20 μm. The thickness of the bottom electrode is preferably 200 nm to 400 nm. The thickness of the intermediate dielectric layer is preferably 60 μm to 80 μm. The thickness of the conductive electrode layer is preferably 200 nm to 400 nm. The thickness of the top electrode is preferably 200 nm to 400 nm. The thickness of the top flexible substrate is preferably 10 μm to 20 μm.

The lead wires on the parallel electrodes are in a spiral shape. The two spiral lead wires on the two parallel electrodes are staggered. Through the staggered arrangement of the two lead wires, the lengths of the lead wires are increased, thereby improving the sensitivity of temperature measurement.

Another aspect of the disclosure provides a sensor signal acquisition system based on a variable topology switching matrix. The acquisition system includes the above-mentioned multi-modal field-programmable metamorphic sensor, a control module, a multiplexer switch module, a variable topology switch module, a signal acquisition module, and a data processing module.

The multiplexer switch module is connected to the metamorphic sensor. Each terminal on the metamorphic sensor corresponds to multiple lead wires in the multiplexer switch module. According to a physical quantity to be measured, a corresponding lead wire is selected from the corresponding lead wires of each terminal for the measurement of the physical quantity to be measured. The number of lead wires is equal to the number of physical quantities that each lead wire used to measure.

The variable topology switch module includes multiple input ports, multiple output ports, and multiple switches, each output port corresponds to each input port, and the multiple switches are disposed between the multiple input ports and the multiple output ports, and different lead wires are combined through on and off combinations of different switches, so as to implement the measurement of different physical quantities.

The signal acquisition module is connected to the data acquisition module, and is configured to convert the signal from the variable topology switch module into a digital signal.

The data processing module is connected to the control module, and is configured to analyze the digital signal from the signal acquisition module and transmit the analyzed result to the controller.

The controller is respectively connected to the multiplexer switch module and the variable topology switch module, and is configured to control the on and off of each switch in the multiplexer switch module and the variable topology switch module.

For a physical quantity P to be measured, the controller first determines a terminal A, B, . . . , I, . . . , N corresponding to the physical quantity to be measured on the metamorphic sensor, then determines and selects a lead wire IP, which measures a physical quantity P connected to the terminal I in the multiplexer switch module, and finally determines and controls the on and off of different switches in the variable topology switch module, thereby implementing the combinations of lead wires AP, BP, . . . , IP, . . . , NP, obtaining a signal of the physical quantity P to be measured at an output terminal of the variable topology switch module, and transmitting the signal of the physical quantity P to be measured to the controller through the signal acquisition module and the data processing module, so as to implement the measurement of the physical quantity P to be measured.

Further preferably, the controller is further connected to the signal acquisition module and is configured to adjust the gain and filter functions in the signal acquisition module, so that the acquired signal is clear and readable. In the multiplexer switch module, multiple lead wires corresponding to each terminal are disposed on a multiplexer. The corresponding lead wire for measurement is selected through the on and off of the switch in the multiplexer. The number of multiplexers is equal to the number of terminals of the metamorphic sensor. The input ports in the variable topology switch module correspond one-to-one with the multiplexers. Each input port includes m sub-ports, where m is the number of lead wires in the multiplexer corresponding to the input port. The signal acquisition module includes a signal processing unit and a signal conversion unit. The signal processing unit is configured to amplify, filter, and compensate the signal from the variable topology switch module, so as to obtain a processed signal. The signal conversion unit is configured to convert the processed signal to obtain a digital signal, and transmit the digital signal to the data processing module. The signal acquisition module further includes a measurement unit. The measurement unit is one or more combinations of single-wire measurement, double-wire measurement, and multi-wire measurement. The switch in the variable topology module can be multiplexer switch, single pole single throw switch, single pole double throw switch, single pole multi throw switch, or double pole double throw switch.

Figure 1:
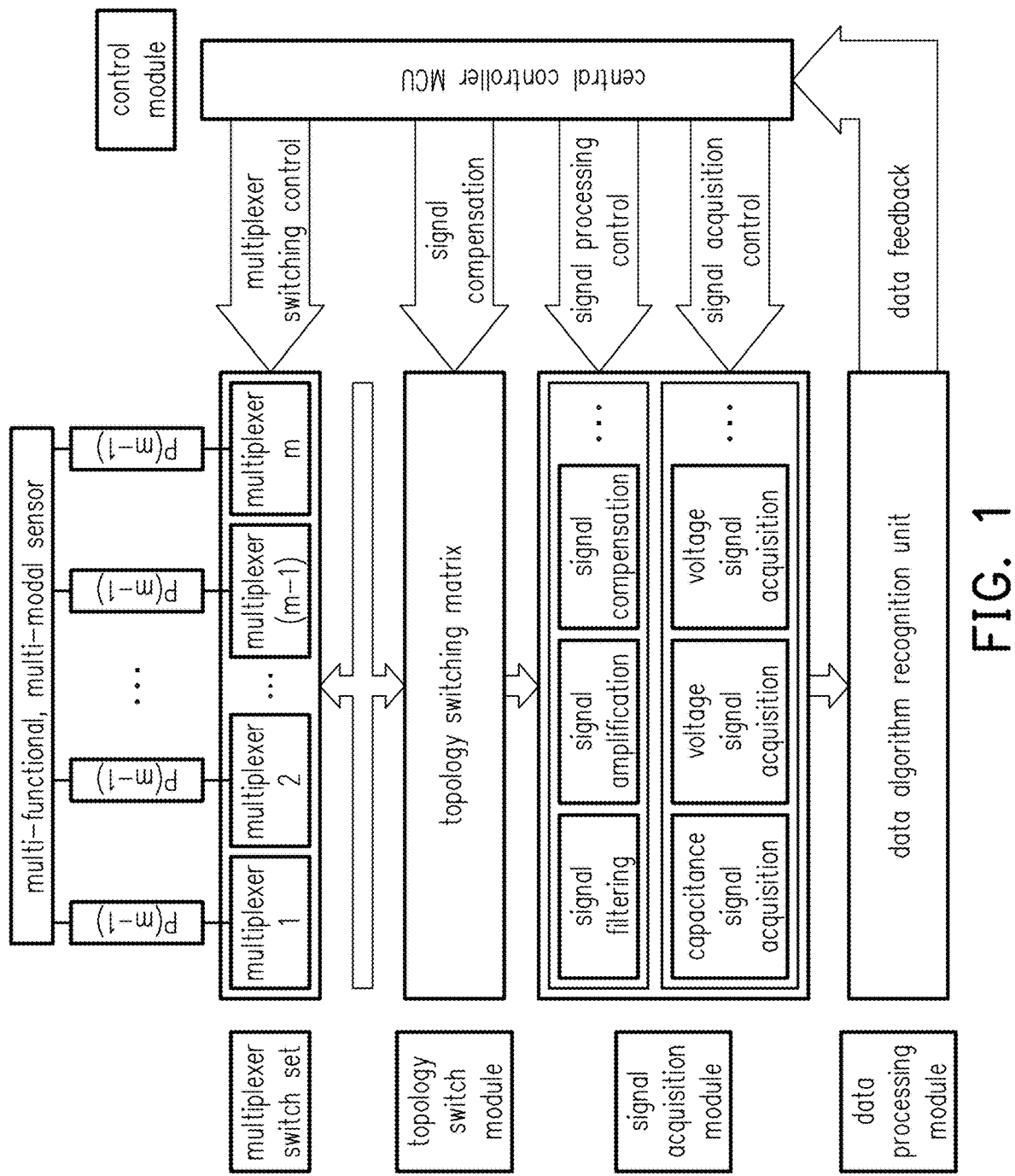
FIG. 1 is a schematic diagram of a structure of a sensor signal acquisition system according to a preferred embodiment of the disclosure.

In all the drawings, the same reference numerals are used to denote the same elements or structures, where: 1001—first electrode, 1002—dielectric layer, 1003—second electrode, 1004—piezoelectric layer, 1005—third electrode, 1006—additional resistor; 3001—substrate, 3002—piezoelectric material layer, 3003—electrode layer, 3004—bottom flexible substrate, 3005—bottom electrode, 3006—intermediate dielectric layer, 3007—conductive electrode layer, 3008—top electrode, 3009—top flexible substrate, 3010—stressed boss.

DETAILED DESCRIPTION OF DISCLOSED EMBODIMENTS

For the objectives, technical solutions, and advantages of the disclosure to be clearer, the disclosure will be further described in detail below in conjunction with the accompanying drawings and embodiments. It should be understood that the specific embodiments described herein are only used to explain the disclosure, and are not intended to limit the disclosure. In addition, the technical features involved in the various embodiments of the disclosure described below may be combined with each other as long as there is no conflict therebetween.

The disclosure provides a multi-modal field-programmable metamorphic sensor. The metamorphic sensor has a multi-layer structure. The multi-layer structure includes an upper electrode layer, a spacer layer, and a lower electrode layer. At least one of the upper electrode layer and the lower electrode layer is a sensor A. The spacer layer is disposed between the electrode layers. A sensor B is formed through forming a structure of electrode layer-spacer layer-electrode layer structure. When detecting an object, the measurement of different physical quantities of different objects is implemented through switching between the sensor A and the sensor B. In addition, the sensor serves as a single cell. Multiple single cells are combined to form a multi-cell sensor.

As shown in FIG. 1, a metamorphic sensor signal acquisition system based on a variable topology switching matrix includes the following modules. The above-mentioned metamorphic sensor, a multiplexer switch module, a variable topology matrix switch module, a signal acquisition module, a data processing module, and a control module.

The multiplexer switch module is composed of multiple multiplexer switches. A common terminal of each multiplexer switch is connected to a terminal in the metamorphic sensor. A multiplexing output terminal of the multiplexer switch is connected to an input terminal of the variable topology switch module. The switching of multiplexing terminals of the metamorphic sensor between different multiplexing functions is implemented through the control of a microcontroller unit (MCU).

An output terminal of the variable topology switch module is connected to measurement units of various functions and wires of the signal acquisition module. The variable topology switching matrix can implement any routing between an input port and an output port. Under the control of the MCU, the various signals can be assembled according to measurement requirements and transmitted to the corresponding signal acquisition module.

The signal acquisition module includes two parts, a signal processing unit and a signal conversion unit. The signal processing unit uses signal filtering, amplification, compensation, etc. to condition an input signal into a signal suitable for acquisition. The signal conversion unit performs analog-to-digital conversion to digitize a processed analog signal.

The data processing module stores acquired data and analyzes acquired information using suitable data processing algorithm, and then feeds back analyzed information to the control module.

The control module controls the switching of the multiplexer switch module and the gating of the variable topology switch module according to actual measurement requirements and feedbacked measurement information, so as to implement the switching and measurement between multiple functions of the metamorphic sensor. At the same time, the controller also adjusts the signal processing and signal acquisition modules, so that the obtained signal is clear and readable.

The signal transmission from a terminal of the metamorphic sensor to a measurement port is as follows. The terminal of the metamorphic sensor is connected to a common terminal of the multiplexer switch module. A number n (n is an integer ≥1) of terminals of the metamorphic sensor module and a number n of multiplexers in the multiplexer switch module are equal, that is, each terminal of the metamorphic sensor is connected to a multiplexer, and n multiplexers are connected in parallel to form the multiplexer switch module. An output terminal $S_{m-i}$ (i= 1, 2, . . . , m) of each multiplexer is connected to an input port $L_{m-I}$ (i=1, 2, . . . , m) of the variable topology switching matrix, where m (m is an integer ≥1) is the number of multiplexing output ports of each multiplexer, and m is equal to the functional multiplexing number of an output terminal of the connected metamorphic sensor. For example, a terminal of the metamorphic sensor may be used for measuring voltage, current, and resistance, that is, the functional multiplexing number thereof is 3, and the number of lead wires on the multiplexer corresponding to the terminal is 3, that is, m=3.

For the input port $L_{m-i}$ (i=1, 2, . . . , m) of the variable topology matrix switch module, m represents the topological level of the input port. The number of input ports with the same topological level is equal to the number of terminals with the same functional multiplexing number in the metamorphic sensor. For example, 5 terminals in the metamorphic sensor may be used for measuring 4 different physical quantities, then m=4, and there are 5 sets of input ports with the same topological level.

The input ports of different topological levels of the variable topology switching matrix are downward compatible to adapt to more working conditions. That is, the input port of a high topological level may serve as the input port of a low topological level. The unused input port of the high topological level needs to be suspended or short-circuited according to actual measurement.

The output terminal of the variable topology switch module is selectively connected to the corresponding signal acquisition module through the control of the MCU. The number of output terminals of the variable topology switch module depends on the type and number of signal detection units used, which is the sum of input ports required by all measurement modules.

The signal acquisition module is connected to the data processing module, and is interconnected to communicate with a microcontroller unit (MCU) after being recognized through an algorithm. The central controller recognizes the feedbacked information received to generate a corresponding control signal, so as to control the connections of multiplexer switch modules at all levels, the variable topology switch module, the signal acquisition module, and the data processing module.

Figure 2:
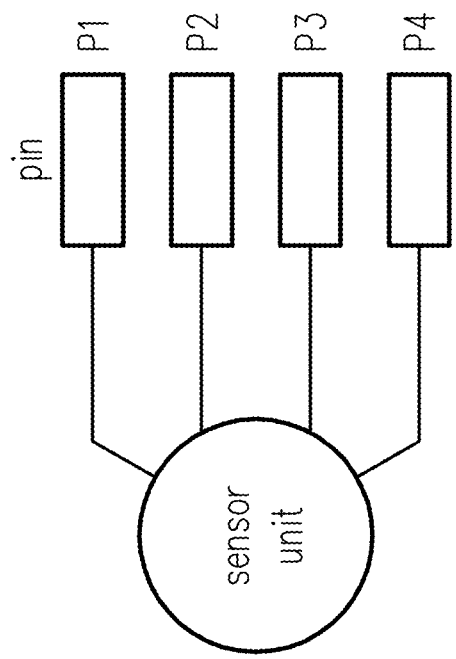
FIG. 2 is a schematic diagram of a sensor and functions thereof according to a preferred embodiment of the disclosure.

As shown in FIG. 2, the metamorphic sensor in the drawing may use multiple measurement principles to complete multiple physical quantity measurements through the time-division multiplexing of terminals and the combination between multiple terminals, which can increase the functional integration of the metamorphic sensor. Different measurement principles may also be used to measure the same physical quantity, so as to improve the accuracy and scope of measurement. The main feature of such metamorphic sensor is to use as few lead wires as possible to implement multiple modes of measurements.

As shown in the metamorphic sensor in FIG. 2, a terminal P1 is used in all four functions A, B, C, and D, a terminal P2 is used in the three functions B, C, and D, a terminal P3 is used in the two functions C and D, and a terminal P4 is used in the function D. That is, the functional multiplexing numbers of the four terminals P1, P2, P3, and P4 of the sensor unit are respectively 4, 3, 2, and 1. According to the above descriptions of the multiplexer switch module, under such application scenario, the terminal P1 of the sensor unit should be connected to the common terminal of a 4-to-1 multiplexer, and the terminal P2 of the sensor unit should be connected to the common terminal of a 3-to-1 multiplexer, the terminal P2 of the sensor unit should be connected to the common terminal of a 2-to-1 multiplexer, and the terminal P4 of the sensor unit should be directly connected to the input and output ports of the variable topology switching matrix as the terminal P4 only has one function without the need to switch.

Figure 3:
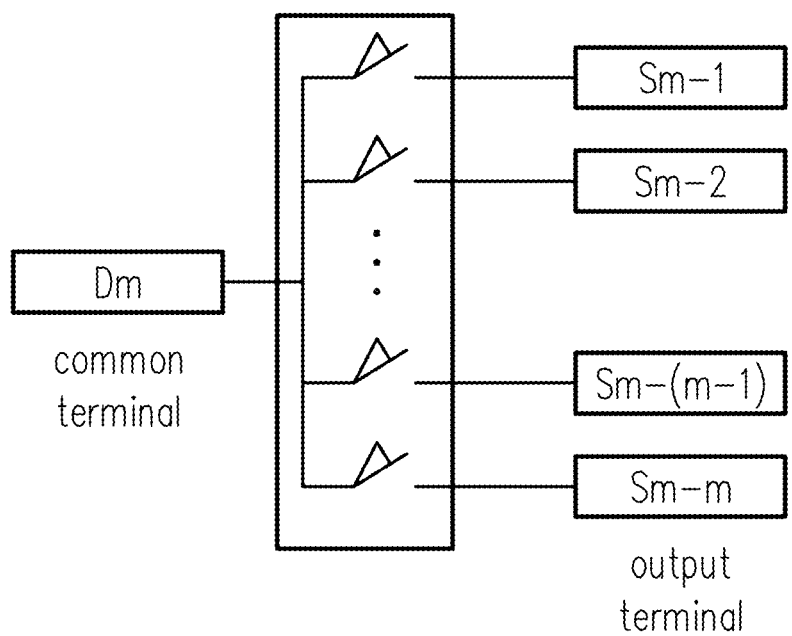
FIG. 3 is a principle diagram of an m-to-1 multiplexer switch according to a preferred embodiment of the disclosure.

As shown in FIG. 3, the left terminal of the multiplexer in the drawing is a common port, and m output terminals are connected behind the common port. A switch is disposed between the common port and the output terminal. Through the on and off of the switch, which physical quantity to measure is chosen, that is, one is chosen from m.

Figure 4:
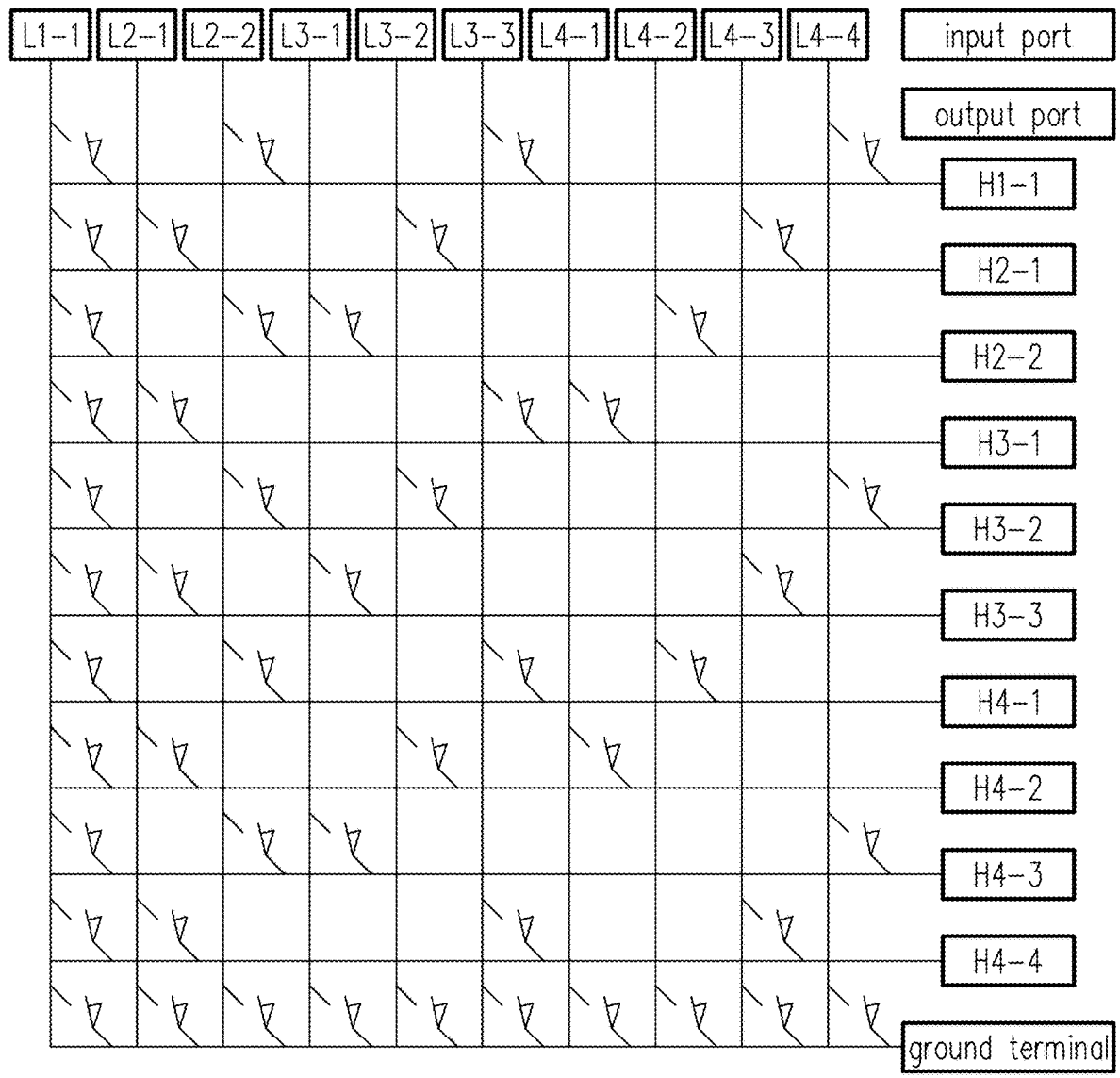
FIG. 4 is a schematic diagram of a variable topology switching matrix according to a preferred embodiment of the disclosure.

As shown in FIG. 4, in the variable topology switching matrix, an one-level input column L1-1 of the variable topology switching matrix is connected to a single-channel switch S1-1 in the multiplexer switch module; a two-level input column L2-j (j=1, 2) is connected to a control input terminal S2-j (j=1, 2) of the 2-to-1 multiplexer in the multiplexer switch module; a three-level input column L3-j (j=1, 2, 3) is connected to a control input terminal S3-j (j=1, 2, 3) of the 3-to-1 multiplexer in the multiplexer switch module; and a four-level input column L4-j (j=1, 2, 3, 4) is connected to a control output terminal S4-j (j=1, 2, 3, 4) of the 4-to-1 multiplexer in the multiplexer switch module. By analogy, an n-level input column is Ln-j (j=1, 2, . . . , n), and is connected to a multi-output terminal Sn-j (j=1, 2, . . . , n) of an n-to-1 multiplexer.

The above illustrates the correspondence between the output ports of the multiplexers of different scales and the input ports of the variable topology switching matrixes of different levels. If there are b terminals with a functional multiplexing number a in a certain metamorphic sensor, then each terminal should be connected to a b-to-1 multiplexer switch. Therefore, in the variable topology switching matrix, there should also be b a-level input port sets corresponding thereto.

The output port of the variable topology switching matrix module is connected to different measurement units in the signal acquisition module. The measurement units may be divided into single-wire measurement, double-wire measurement, and multi-wire measurement according to different measurement principles and functional requirements for wires. The output ports of the variable topology matrix module may be divided into output port sets of different levels in order to be able to connect with measurement units of any wires. During the implementation process, the single-wire measurement unit is connected to an one-level output port H1-1 of the variable topology switching matrix; the double-wire measurement module is connected to a two-level output port H2-j (j=1, 2); a triple-wire measurement unit is connected to a three-level output port H3-j (j=1, 2, 3); and a quad-wire measurement unit is connected to a four-level output port H4-j (j=1, 2, 3, 4). By analogy, an n-wire measurement module is connected to an n-level output port Hn-j (j=1, 2, . . . , n).

The above illustrates the correspondence between different wire measurement units and output ports of different levels of the variable topology switching matrix. During the specific implementation process, according to actual functional requirements, if a sensor unit requires b modules of a-wire measurement, then there should be b a-level output ports in the variable topology switching matrix corresponding thereto.

The metamorphic sensor may have multiple single-function terminals or multiple multiplex-function terminals. Therefore, under normal circumstances, multiple multiplex terminals should act simultaneously, and the multiplex number of the terminals may also be different. For example, when adopting the quad-wire measurement, four terminals with a multiplex number of 1, that is, single-function terminals, may be used, or m terminals with a multiplex number of 1, n terminals with a multiplex number of 2, p terminals with a multiplex number of 3, and q terminals with a multiplex number of 4, where m+n+p+q=4, and m, n, p, q are all integers ≥0. Assuming m=n=p=q=1, then the corresponding multiplexing function may be selected for each terminal through controlling the four multiplexer switches while generating a driving signal through the central controller (MCU) to drive a matrix switch gating H4-i (i=1, 2, 3, 4), so as to implement the quad-wire measurement. By analogy, the method may implement the switching of any signal and perform the measurement of any wire. The multi-wire measurement refers to the number of terminals required on the metamorphic sensor when measuring unit measurements.

A typical example is the sensor unit shown in FIG. 2. The metamorphic sensor has four terminals, and 4 functions may be implemented through combining different terminals. Function A is a single-wire measurement, which requires the terminal P1; Function B is a double-wire measurement, which requires the terminals P1 and P2; Function C is a triple-wire measurement, which requires the terminals P1, P2, and P3; and Function D is a quad-wire measurement, which requires the terminals P1, P2, P3, and P4. Therefore, the variable topology matrix needs to have 10 output ports for the four measurement modules to be connected at the same time.

According to the principles of the above-mentioned multiplexer switch module and variable topology matrix, an implementation method of a circuit having such structure is provided. The functional multiplexing number of the terminal P1 of the sensor unit is 4, which needs to be connected to a 4-to-1 multiplexer switch. Then, a multiple output port S4-j (j=1, 2, 3, 4) of the multiplexer switch is connected to a four-level input port L4-j (j=1, 2, 3, 4) of the variable topology switching matrix. In order to implement any interconnection with 10 output ports, 10 single pole single throw switches regularly arranged may be connected to the output ports. The functional multiplexing number of the terminal P2 of the sensor unit is 3, which needs to be connected to a 3-to-1 multiplexer switching. Then, a multiple output port S3-j (j=1, 2, 3) of the multiplexer switch is connected to a three-level input port L3-j (j=1, 2, 3) of the variable topology switching matrix. In order to implement any interconnection with 10 output ports, 10 single pole single throw switches regularly arranged may be connected to the output ports. The terminals P3 and P4 of the sensor unit may also be connected to the output ports in a similar manner. The variable topology switching matrix, as shown in FIG. 4, any terminal of the sensor unit of the measurement module may be gated to the measurement terminal of any measurement unit through controlling the gating of the variable topology switching matrix and the switching of the multiplexer switch module.

The signal acquisition part is mainly composed of a signal processing unit and a signal acquisition unit. The signal processing unit includes a signal amplification processing module, a signal filtering processing module, a signal compensation circuit module, etc., which condition an input signal into a signal suitable for acquisition. The signal acquisition unit quantifies the signal to be transmitted to the data processing unit. A data algorithm recognition unit stores received data, analyzes various physical quantities acquired by the acquisition module by adopting a corresponding data processing algorithm, and then feeds back to the control module. The microcontroller unit completes the switching of multiple functions and the control of signal acquisition according to feedbacked test data obtained.

Figure 5:
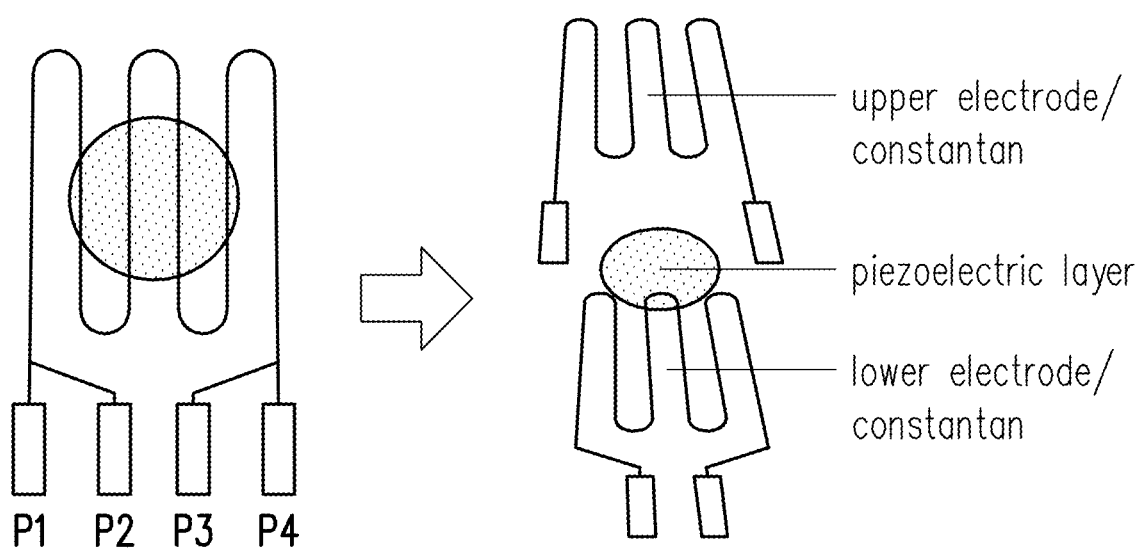
FIG. 5 is an implementation example of a sensor according to a preferred embodiment of the disclosure.

FIG. 5 shows a more specific typical example of a metamorphic sensor. The metamorphic sensor is composed of a three-layer structure leading 4 terminals to implement 3 types of measurement functions, as follows:

| Terminal combination | Function | Physical quantity to be measured |
|---|---|---|
| P1, P4 | Temperature measurement | Resistance |
| P2, P3 | Strain measurement | Resistance |
| P1, P2, P3, P4 | Pressure measurement | Voltage |

An upper electrode material of the metamorphic sensor is constantan. The two terminals P1 and P4 are connected to a resistance measurement module for temperature measurement. A lower electrode material is constantan. The two terminals P2 and P3 are connected for strain measurement. There is a lead zirconate titanate (PZT) layer between the upper and lower electrode layers. According to the piezoelectric effect of the PZT layer, the four terminals P1, P4, P2, and P3 are connected to a voltage measurement module for measuring the pressure between the upper and lower layers.

Figure 6:
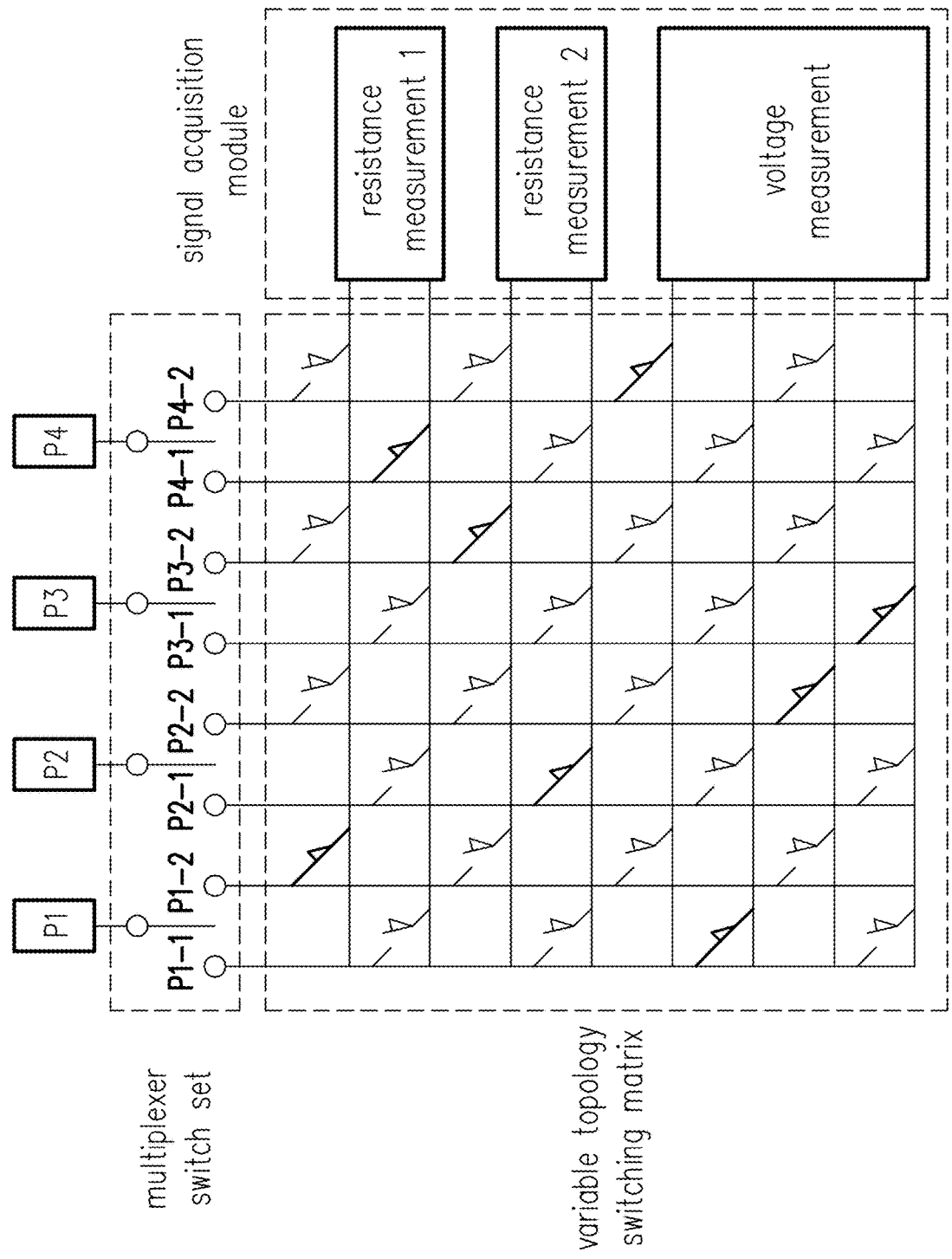
FIG. 6 is a topology diagram of a sensor measurement solution according to a preferred embodiment of the disclosure.

According to the implementation principle of the above-mentioned matrix switch and the descriptions of the metamorphic sensor in FIG. 5, a switching solution of the switch for the metamorphic sensor may be designed, as shown in FIG. 6. The measurement solution has three measurement modules, respectively corresponding to three measurement functions of temperature, strain, and voltage. The combination of different terminals is connected to the measurement module through the switching of the switch, so as to implement the switching of the three functions. The metamorphic sensor has a total of 4 terminals. The functional multiplexing number of each terminal is 2. Therefore, each terminal is connected to a single pole double throw switch. The arrangement of the matrix switch and the switching state thereof during work are as shown in FIG. 6. When measuring temperature, the temperature measurement function of the terminals P1 and P4 is used. Therefore, single pole double throw switches P1-2 and P4-1 are conducted to transmit the signal on the terminals P1 and P4 of the metamorphic sensor to a resistance measurement 1 module, so as to implement the measurement of temperature. When measuring strain, the strain measurement function of the terminals P2 and P3 is used to control single pole double throw switches P2-1 and P3-2 to be conducted to transmit the signal of the terminals P2 and P3 of the metamorphic sensor to a resistance measurement 2 module, so as to implement the measurement of strain. When measuring pressure, the pressure measurement function of the terminals P1, P2, P3, and P4 is used. At this time, single pole double throw switches P1-1, P2-2, P3-1, and P4-2 are controlled to be conducted to transmit the signal of the 4 terminals to the voltage measurement module, so as to implement the measurement of pressure. During the switching process of the various functions of the metamorphic sensor, the matrix switch does not need to be switched. The functions of the terminals of the metamorphic sensor are switched only through controlling the single pole double throw switches. The matrix switch may realize the combination of different terminals on its own, which can easily implement the switching of multiple measurement functions of the metamorphic sensor. The control of the solution is simple and clear, and the measurement modules are independent of each other without interference therebetween.

The switches used in the variable topology switching matrix designed according to the disclosure includes, but is not limited to, the single pole single throw switches and single pole double throw switches in FIG. 4 and FIG. 6. Different types, such as multiplexer switch, single pole multi throw switch, double pole double throw switch, etc., may be selected according to specific application scenarios to meet any routing solution of the input port and the output port. The microcontroller unit (MCU) according to the disclosure may be implemented using various controllers, such as single-chip microcomputer with MCS-51 core, controller with advanced RISC machine (ARM) core, digital signal processor (DSP), complex programmable logic device (CPLD), field-programmable gate array (FPGA), etc.

The disclosure will be further described below with reference to specific embodiments.

Embodiment 1

Figure 7:
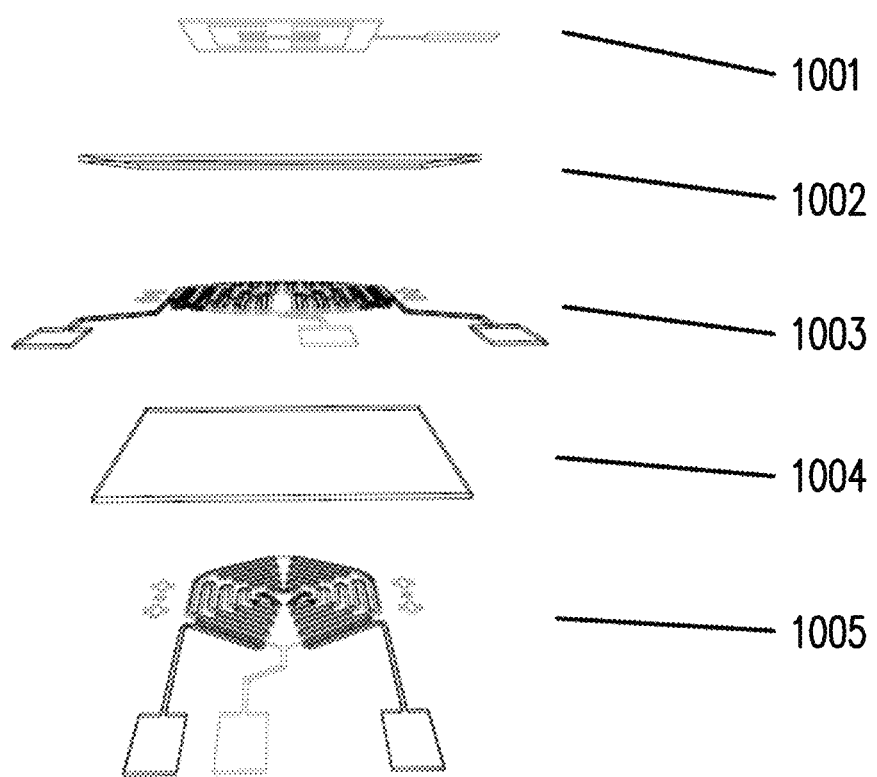
FIG. 7 is a schematic diagram of an exploded structure of a single-cell flexible smart skin according to a preferred embodiment of the disclosure.

In the embodiment, a first electrode serves as an upper electrode layer and a third electrode serves as a lower electrode layer. A spacer layer includes a dielectric layer and a piezoelectric layer. A main part of a metamorphic sensor includes a total of five-layer structure, as shown in FIG. 7. From top to bottom are sequentially a first electrode 1001, a dielectric layer 1002, a second electrode 1003, a piezoelectric layer 1004, and a third electrode 1005.

The first electrode may serve as an electromagnetic wave absorption layer. The second electrode 1003 may be configured to measure strain and humidity. The third electrode 1005 may be configured to measure temperature. The first electrode 1 has a terminal G, the second electrode 1003 has three terminals A, D, and F, and the third electrode 1005 has three terminals B, C, and E. Each single-cell metamorphic sensor has a total of 7 terminals. The thickness of the entire device is 20 μm to 30 μm. The device has very good flexibility, which is very suitable to be attached to the curved surface of an aircraft for in-situ measurement of multiple physical quantities.

Figure 9:
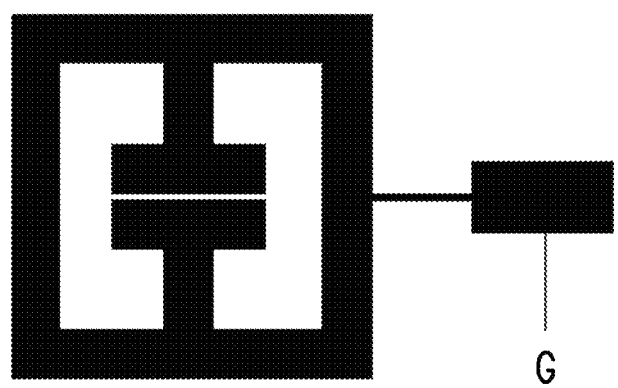
FIG. 9 is a schematic diagram of a structure of a first electrode according to a preferred embodiment of the disclosure.

As shown in FIG. 9, the first electrode 1001 is a metamaterial structure with electromagnetic wave absorption function, and adopts for example, a cross-shape, zigzag shape, circular structure, etc. When a field-programmable metamorphic sensor is in no-working mode, the first electrode 1001 itself constitutes an inductor-capacitor (LC) oscillation circuit to absorb electromagnetic waves in the external environment, so that the object is in an invisible state. In the embodiment, the first electrode has an electromagnetic wave absorption structure adopting a split-ring resonator.

Figure 10:
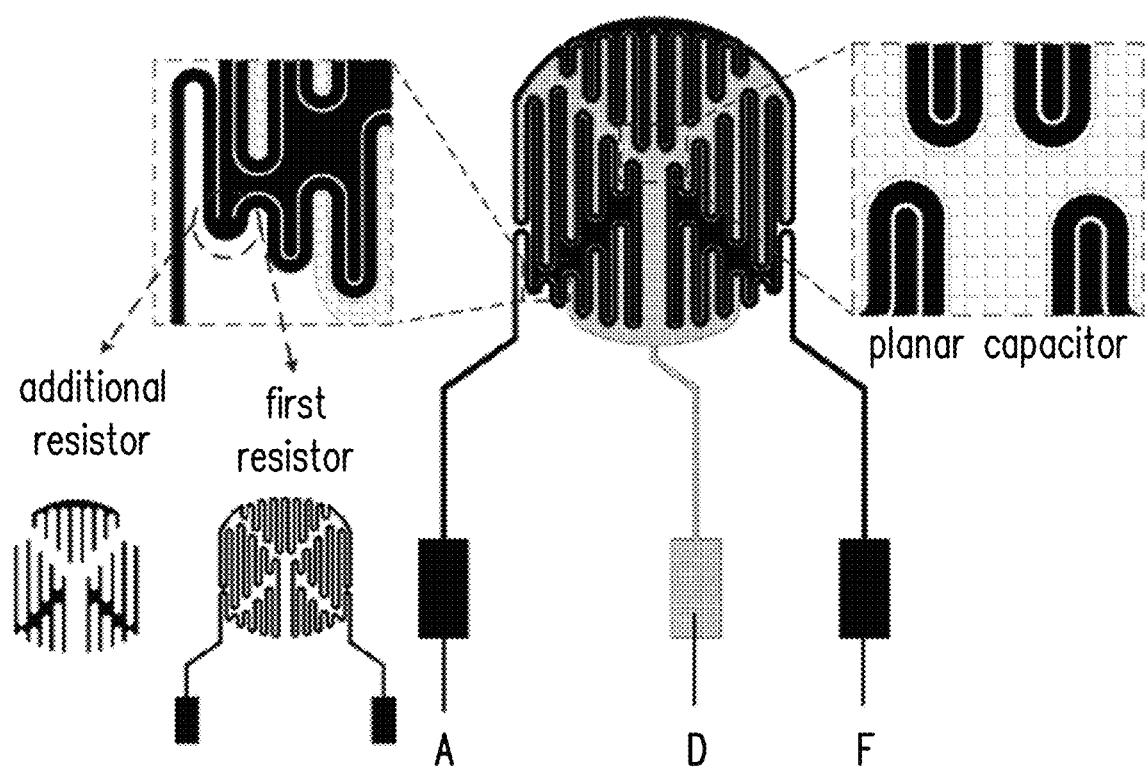
FIG. 10 is a schematic diagram of a structure of a second electrode according to a preferred embodiment of the disclosure.

As shown in FIG. 10, the second electrode 1003 includes a first resistor having a metallic sensitive strain grating structure, whose material may be constantan, and further includes a second resistor engaged with the first resistor. In FIG. 10, the black area is the first resistor and an additional resistor. The first resistor and the additional resistor are coordinatively disposed. The additional resistor is filled in a gap of the metallic sensitive strain grating structure formed by the first resistor and is connected to the first resistor at a certain point. The gray grid area is the second resistor. The first resistor and the second resistor are disposed in parallel into an interdigital electrode to cooperatively form a planar capacitance sensor for the humidity measurement on the surface of the aircraft. The metallic sensitive strain grating structure greatly increases the area coverage of the entire second electrode 1003. When the second electrode 1003 is used alone, the second electrode 1003 may separately serve as a resistance sensor and a capacitance sensor for respectively measuring strain and humidity of the object. When used for measuring humidity, the dielectric constant of the capacitance of the planar capacitance sensor is related to the humidity of the environment.

The first resistor adopts a metallic sensitive strain grating foil, i.e. from terminal A to terminal F in FIG. 10, whose material is selected as constantan ($Cu_{55}Ni_{45}$). Constantan has a relatively large resistivity and a low temperature coefficient of resistivity. Under the premise of accurate strain measurement, the influence of temperature is very small. Each resistance strain unit $R_x$ is interconnected with three standard resistors R to form a Wheatstone full-bridge circuit. If the power supply voltage of the bridge is $V_{cc}$, then the partial pressure difference across the bridge arms is:

$$\Delta V = Vcc \times \frac{RR_x - R^2}{2R(R + R_x)}$$

Through measuring the value of $\Delta V$, the resistance of a strain sensor unit at the place may be obtained, so as to calculate the strain value at the place. Further, in order to increase the area coverage of the entire second electrode, the second resistor is designed, which constitutes a planar capacitance sensor together with the first resistor. The direct area of the polar plates and the spacing between the polar plates of the capacitor are fixed. Therefore, the capacitance is only related to the dielectric constant between the polar plates. Furthermore, the dielectric constant is easily affected by the humidity of the environment, so when the humidity changes, the capacitance of the parallel capacitor will change accordingly, which may be configured to measure the humidity of the surface of the aircraft.

Figure 11:
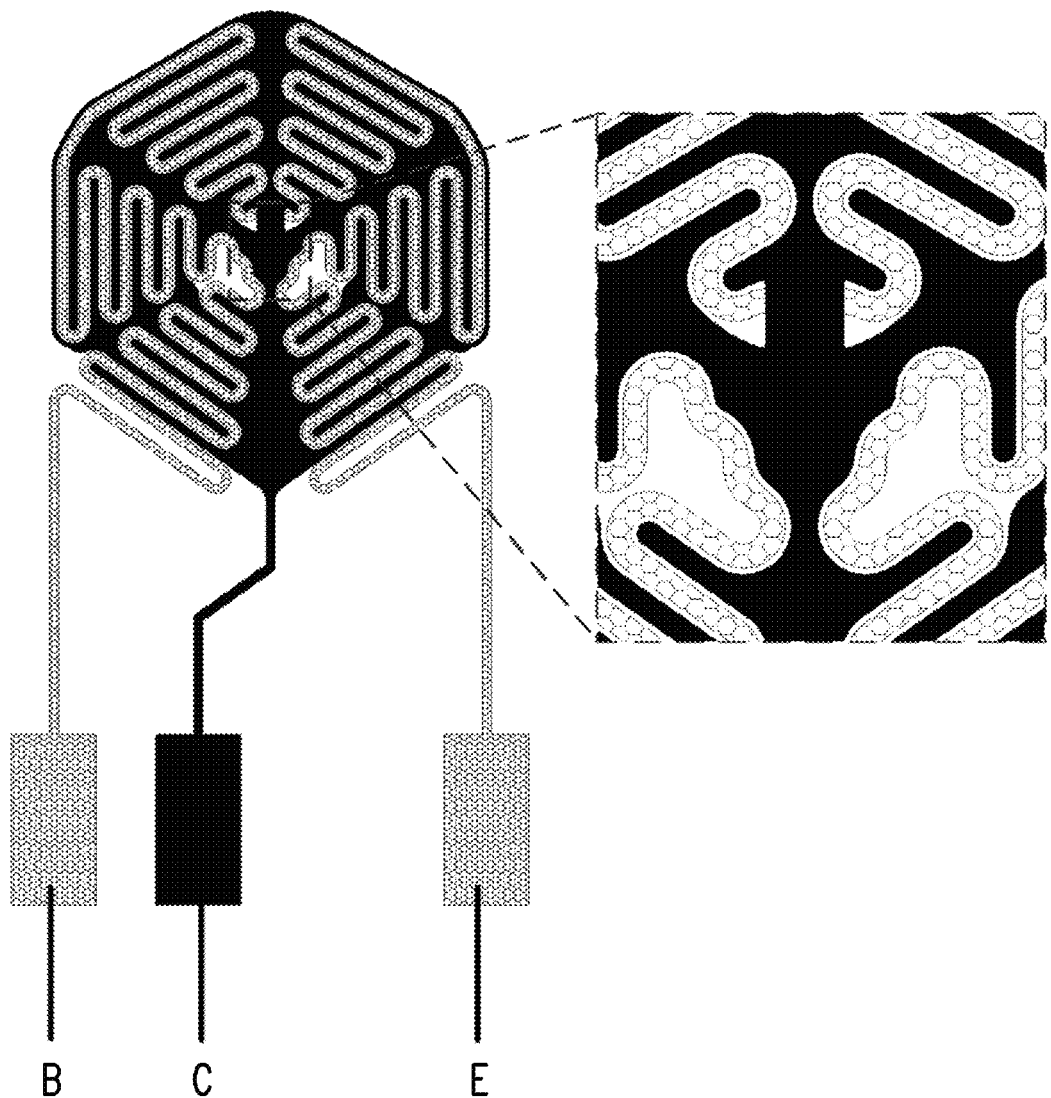
FIG. 11 is a schematic diagram of a structure of a third electrode according to a preferred embodiment of the disclosure.

As shown in FIG. 11, the third electrode 1005 includes two resistors with greatly different thermoelectric coefficients. One of the resistors is a thermal resistance namely the third resistor with temperature sensitive metallic grating foil. The white serpentine zigzag area in the figure is the third resistor, whose material may be selected as metal platinum. In order to further increase the area coverage of the third electrode 1005, a fourth resistor connected to the temperature sensitive platinum grating is provided. The black area in the figure is the fourth resistor. In the white dotted box of the enlarged diagram in FIG. 11, it can be seen that the third resistor is connected to the fourth resistor. The material of the fourth resistor may be selected as platinum rhodium. The two resistors cooperate to form a thermocouple sensor for a larger range of temperature measurement. A larger range of temperature measurement is completed or the robustness of temperature measurement is increased to compensate for the lack of temperature measurement range of the third resistor. Within a low temperature range, the measurement results of the two may also be mutually verified.

An additional resistor 1006 is further connected to the fourth resistor. As shown in FIG. 11, the effect of the additional resistor is to increase the area coverage of the third electrode.

In the embodiment, the third resistor uses metal platinum with a relatively high temperature coefficient of resistance as the material of the temperature sensing layer. The structure of a resistance temperature unit is designed as a metallic sensitive grating uniformly distributed along eight directions, as shown from a terminal B to a terminal E in the drawing, so as to ensure the accuracy of temperature measurement. When temperature changes, the resistance of the resistance temperature unit will change linearly. The temperature of the place may be reflected through measuring the resistance between the terminals B and E.

In addition, in order to increase the area coverage of the entire third electrode, the fourth resistor is designed to be connected to the third resistor, so that the duty ratio of the entire third electrode is increased from 42% to 88%, which greatly improves the electrical output performance thereof. Also, the material of the fourth resistor is selected as platinum-rhodium alloy, which constitutes a platinum-platinum-rhodium thermocouple sensor with the third resistor of platinum material.

A platinum resistance temperature sensor has higher sensitivity and accuracy, but the measurement range is −50° C. to 150° C. Although the accuracy of a thermocouple is lower, the measurement range may be up to 2000° C. Due to the limitation of the substrate material, the measurement range may work from 0° C. to 350° C. Therefore, within the low temperature range, a platinum resistance temperature sensor mode is selected to improve the accuracy of measurement. A thermocouple temperature sensor mode may also be selected to calibrate the measurement results of the platinum resistor. When within a high temperature range, the measurement accuracy is not very high, so the thermocouple temperature sensor mode may be selected. As such, the accuracy, extensiveness, and robustness of temperature measurement are improved through the changing of the measurement modes.

The materials of a dielectric layer and an insulating flexible substrate may be selected as: PI (fine heat-resistance), PDMS, etc. The dielectric layer separates the first electrode and the third electrode, so that the two may form a capacitor.

The piezoelectric layer is between the second electrode 1003 and the third electrode 1005, so that the second electrode, the piezoelectric layer, and the third electrode collectively form a piezoelectric sensor. The piezoelectric layer may select a piezoelectric material with a large piezoelectric constant, such as piezoelectric ceramic.

Electrodes of different layers of a single sensor may also be used in combination to form some new sensor measurement modalities. Through the gating of the topology logic circuit and the conversion of acquisition terminals, the first electrode-dielectric layer-second electrode structure may constitute a capacitive sensor. Through measuring the change of capacitance, the measurement of static pressure on the surface of the aircraft may be completed. The second electrode 1003-piezoelectric layer-the third electrode 1005 structure constitutes a piezoelectric sensor. When pressure is applied, positive and negative electric charges are polarized on the surface. Output voltage is formed through exporting from the acquisition equipment. The pressure on the surface may be calculated through measuring the voltage between the second electrode 1003 and the third electrode 1005. The piezoelectric sensor has high frequency response, high sensitivity, and fast responding time, which is very suitable for completing the measurement of high-frequency dynamic pressure or vibration signal on the surface of the aircraft.

A multi-layer structure of first electrode-dielectric layer-second electrode-piezoelectric layer-third electrode. For a multi-layer sensor, the typical structure is an electrode-functional layer-electrode structure mode. The most basic function of the electrodes is to export the electrical output signal of the functional layer to the acquisition equipment for acquisition. The material selection is generally required to be compatible with the structural parameters of the functional layer and the preparation process of the sensor. However, for the design of the electrodes in the disclosure, the upper and lower electrodes not only serve the function of transmitting electrical signals, but also serve functions such as sensors, actuators, sonic transducers, heaters, electromagnetic wave absorption, etc. A single electrode in the disclosure may complete the above functions, and through the design of electrodes with multi-functional constraints, the design in terms of duty ratio and stretching ability has better trade-off. For the sensor having the electrode-functional layer-electrode multi-layer structure, such as piezoelectric sensor, capacitor sensor, etc., through the heterogeneous design of the upper and lower electrodes, a single-cell of the sensor may be given more functions without increasing the complexity of the sensor structure and the difficulty of the preparation process.

Figure 8:
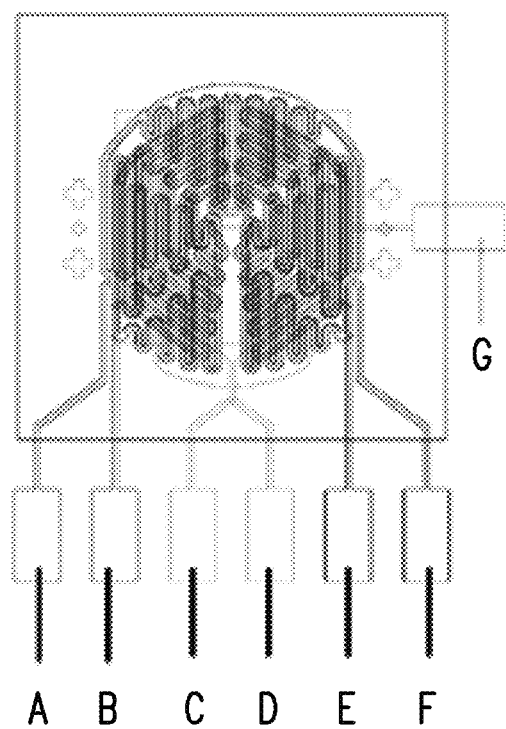
FIG. 8 is a schematic diagram of a top-view structure of a single-cell flexible smart skin according to a preferred embodiment of the disclosure.
Figure 13:
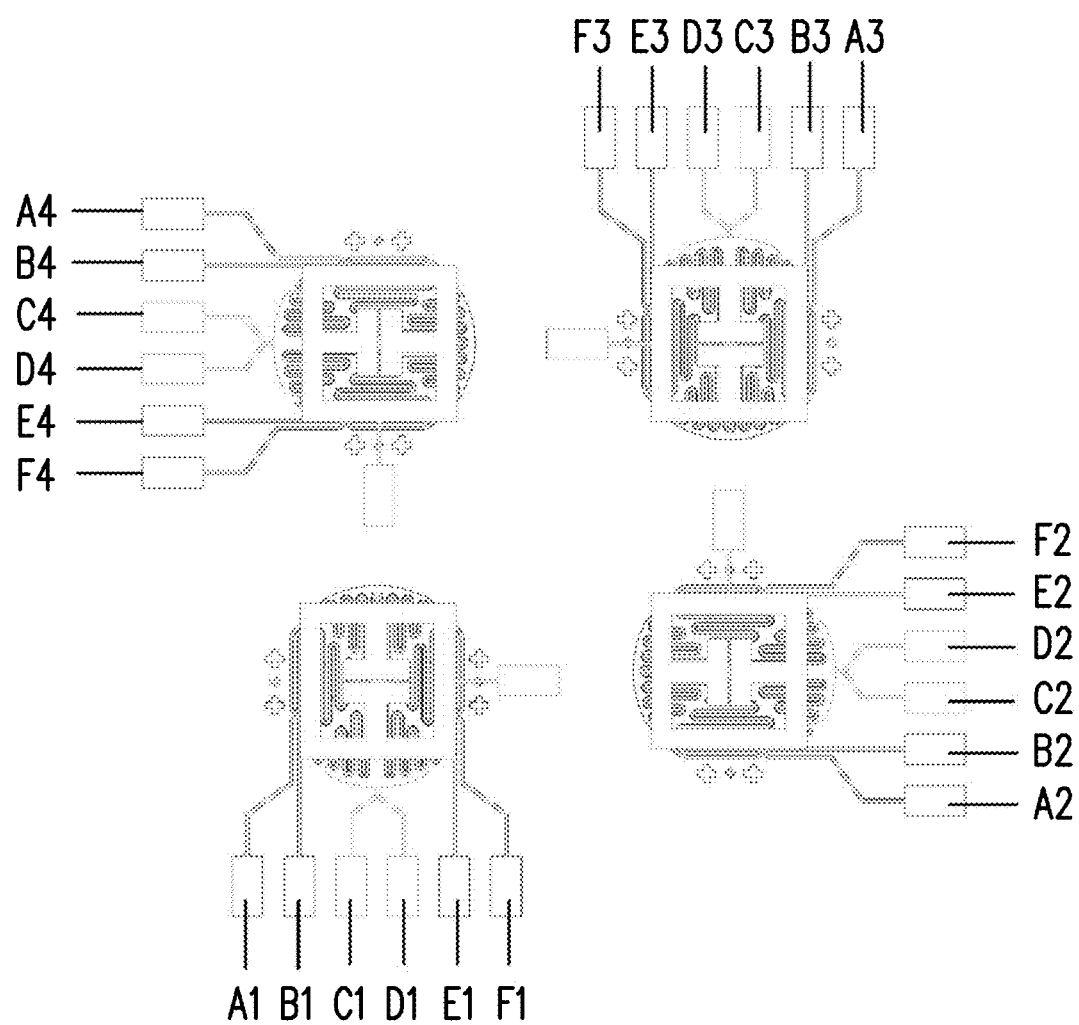
FIG. 13 is a schematic diagram of a multi-cell flexible smart skin combination according to a preferred embodiment of the disclosure.

As shown in FIG. 13, the metamorphic sensor serves as a single cell. When multiple single cells collectively form a multi-cell structure. When in the multi-cell structure, the single cell serves as electrical signal input for stimulus or excitation to complete other experimental monitoring or measurement requirements. The requirement for electrodes is that a single-layer electrode requires two terminals to facilitate the output and input of electrical signals. The second electrode and the third electrode are both designed to the sensitive grating with metallic foil structure. As shown in FIG. 8, each single cell contains 7 terminals. For a multi-cell structure containing 4 single cells, there are 28 terminals in total. The second electrode and the third electrode adopt different materials to complete the measurement of different physical quantities. For example, when constantan and platinum are respectively adopted, the measurement of strain and temperature may be completed. When the second electrode and the third electrode respectively serve as sensors, the two terminals A and F and B and E of the first resistor of the second electrode and the third resistor of the third electrode are respectively connected to the lead wires, so that the temperature or strain of each unit may be measured. The four single cells of the multi-cell structure are arranged in different directions, and the first resistors of the second electrodes are also arranged in different directions, so that strain in different directions may be measured. When the second electrode, the piezoelectric layer, and the third electrode serve as pressure sensors, the two terminals of the second electrode are connected to form a port, and the two terminals of the third electrode are connected to form a port. For example, the terminals A and F are connected as a port O, and the terminals B and E are connected as a port P. The output voltage between the ports O and P is measured to obtain the pressure at the place. When one of the single cells serves as an excitation, an excitation signal source is connected between the two terminals of the second electrode of one of the single cells. For example, when a direct current is connected between terminals B1 and E1, the third electrode becomes a heat source. The flow velocity at the place may be calculated through measuring the resistance between the two terminals of the third electrode of other single cells, for example, the resistance between terminals B2 and E2, B3 and E3, and B4 and E4. When an AC voltage is inflicted between the second electrode and the third electrode of a single cell, the quality state, including whether there is any crack and impact at the place of measurement, of the other single cells may be reflected through measuring the voltage between the second electrode and the third electrode of other single cells, which is widely applied in structural health monitoring.

Figure 12:
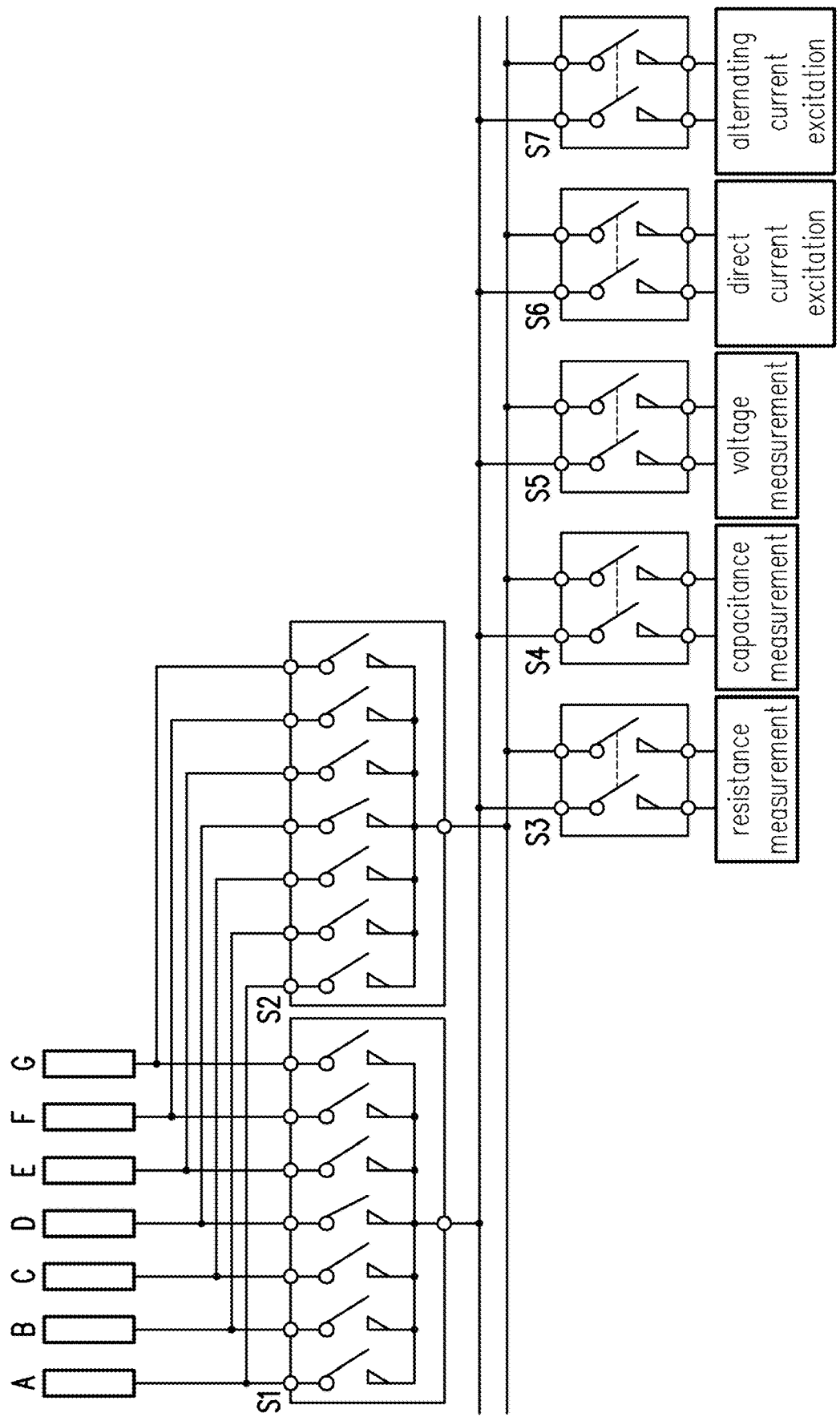
FIG. 12 is a schematic diagram of a principle of a topology logic circuit according to a preferred embodiment of the disclosure.

As shown in FIG. 12, each single-cell sensor has 7 terminals A, B, C, D, E, F, and G. The switching of the 7 terminals are controlled by respectively selecting two multiplexer electronic switches S1 and S2, so that the output or input of any two terminals may be implemented. Combining with the specific embodiment of the disclosure, multiple measurement functions are not used at the same time, so a common bus may be adopted, which greatly simplifies the complexity of the topology logic circuit. Therefore, at the other end of the circuit, switches S3, S4, S5, S6, and S7 adopt dual pole switches, for respectively connecting to the five corresponding equipment for resistance measurement, capacitance measurement, voltage measurement, direct current excitation, and alternating current excitation, which cover all 8 measurement functions of the field-programmable metamorphotic sensor according to the disclosure. The conversion between different measurement functions will be specifically explained in the following with the structure of each layer.

When measuring, the terminal B is selected through a switch S1 of the topology logic circuit, and the terminal E is selected through a switch S2. The sensor works in a platinum resistance temperature sensor mode, a switch S3 is closed, and switches from S4 to S7 are disconnected. The terminals B and E are connected to a resistance acquisition equipment such as an inductance-capacitance-resistance (LCR) meter or a digital multimeter to measure the resistance value and change of the resistance temperature unit. The temperature change at the place may be calculated from the sensitivity coefficient value obtained through the calibration experiment, so that the temperature value at the place may be obtained. The resistance temperature unit is connected to the bridge. The temperature value at the place may also be calculated through measuring the voltage change at both ends of the bridge. A terminal C is selected through the switch S1 of the topology logic circuit, and a terminal B or E is selected through the switch S2. The sensor works in a thermocouple temperature sensor mode, and the switch S5 is closed. The electric potential between the terminals B and C is measured to obtain the temperature at the place.

When the third electrodes need to serve together as electrodes, the switch S1 simply selects the terminals B, C, and E at the same time. When multiple units are used in combination, the switch S1 of the topology circuit of the first unit selects a terminal B1, the switch S2 selects a terminal E1, and the switch S6 is closed. The electrode becomes a heater source. The switch S1 of the topology circuit of the second unit selects a terminal B2, the switch S2 selects a terminal E2, and a selection switch S3 is closed. The flow velocity at the place may be calculated through measuring the resistance at the place.

Through the topology logic circuit, when the switch S1 selects a terminal A, the switch S2 selects a terminal F, the switch S3 is closed, and the resistance measurement equipment is connected, the second electrode works in a strain sensor mode. Through the combination of multiple sensors, the magnitude and direction of strain of the surface of the aircraft may be measured. When the switch S1 selects a terminal D, the switch S2 selects a terminal F, and the switch S4 is closed, the second electrode works in a humidity sensor mode for measuring humidity of the surface of the aircraft. When the second electrodes need to serve together as electrodes, the switch S1 simply selects the terminals A, D, and F at the same time.

The first electrode-dielectric layer-second electrode structure constitutes a capacitor sensor. The switch S1 of the topology circuit selects the terminals A, D, and F, the switch S2 selects the terminal G, and a selection switch S4 is closed. Through measuring the change of capacitance, the measurement of static pressure of the surface of the aircraft may be completed.

The second electrode-piezoelectric layer-third electrode forms a pressure sensor. When pressured, two surfaces of the piezoelectric layer will polarize electric charges proportional to the pressure to be led by the electrodes, so as to form voltage. In the embodiment, the material of the piezoelectric layer is selected as PZT. A piezoelectric thin-film is prepared by a sol-gel method, and then treated by rapid thermal annealing process. The upper surface is the second electrode made of constantan material, and the lower surface is the third electrode made of metal platinum and platinum-rhodium alloy. When the working mode of the field-programmable metamorphic sensor is the pressure sensor, the second electrode 1003 as the top electrode of the piezoelectric sensor collects polarized electric charges generated on the upper surface of the piezoelectric material; and the third electrode as the bottom electrode of the piezoelectric sensor collects polarized electric charges generated on the lower surface of the piezoelectric material. When working, the circuit is gated by a scanning array, the switch S1 selects the terminals A, D, and F as the positive electrodes of the piezoelectric sensor, the switch S2 selects the terminals B, C, and E as the negative electrodes of the piezoelectric sensor, and the switch S5 is closed. Through measuring the output voltage between the two poles, the dynamic pressure acting on the surface of the sensor may be measured. Further, through analyzing the spectrum and phase diagram of the measured voltage curve, the vibration frequency of the surface of the aircraft may be obtained. Moreover, the piezoelectric sensor has large impedance, high frequency response, fast response time, and is less affected by errors due to the environment and measurement wires, which is very suitable for measuring the rapidly changing pressure field around the surface of the aircraft. The four sensors are used in combination. The switch S1 of a first single cell selects the terminals A1, D1, and F1, the switch S2 selects the terminals B1, C1, and E1, and the switch S7 is closed. The electrode structure becomes a surface acoustic wave emission source. The switches S1 of the other three units select the terminals A, D, and F (2 to 4), the switches S2 select the terminals B, C, and E (2 to 4), the switches S5 are closed. The voltage output therebetween is measured to measure any crack and impact at the place, which is widely applied in structural health monitoring.

Through the electrode design of the multi-modal field-programmable metamorphic sensor according to the disclosure, the electrodes of the sensor play different roles and may be configured to complete different functions. The terminals of the electrodes are connected to the logic topology circuit to complete the connection manners between the electrodes through the switching of the circuit, so that the sensor may complete the transformation from certain types to other types of sensors, so as to implement the in-situ measurement of multiple physical quantities such as the pressure distribution, airflow velocity, temperature distribution, stress and strain, vibration, humidity, structural health of the surface of the aircraft. In this way, one sensor may be used to complete the in-situ online measurement of 8 types of functions.

Compared with the traditional wind tunnel measurement technology, the field-programmable metamorphic sensor according to the disclosure has the advantages of large area, ultra-thin, and multifunctional. When used in the field of aircraft, the sensor may in-situ online detect multiple physical parameters without affecting the flow field on the surface of the aircraft. Compared with multi-functional sensors distributed side by side, the spatial density of sensors is greatly increased, and the accuracy of measurement is improved. Compared with sensors stacked layer by layer, the number of lead wires is greatly reduced, and the difficulty of processing and preparation is also reduced.

Embodiment 2

Figure 14:
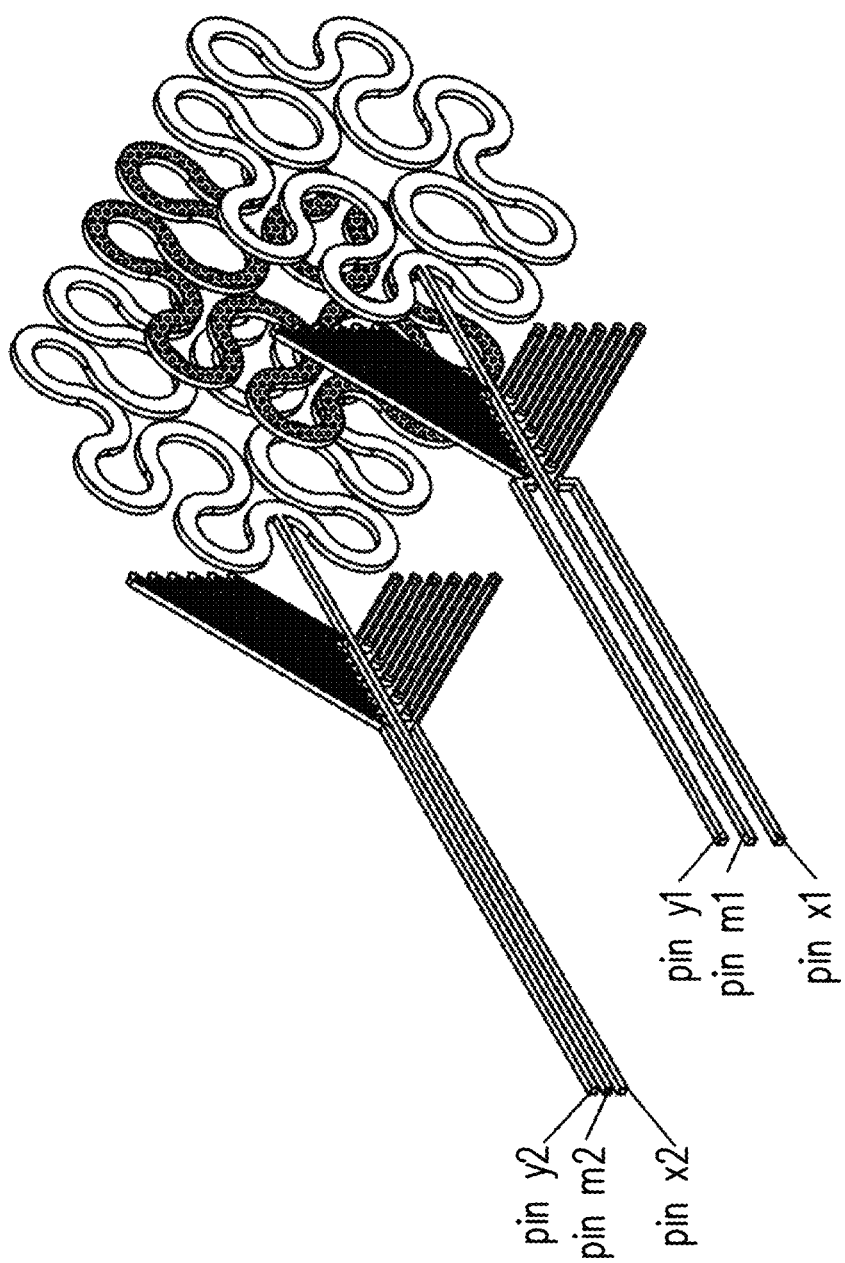
FIG. 14 is a schematic diagram of a three-dimensional structure of a functional layer of a flexible metamorphic sensor according to a preferred embodiment of the disclosure.

As shown in FIG. 14, a field-programmable metamorphic sensor for physiological information monitoring includes an upper electrode layer, a piezoelectric layer, a lower electrode layer and substrate layer. The piezoelectric layer is a spacer layer between the upper layer and the lower layer.

Figure 15:
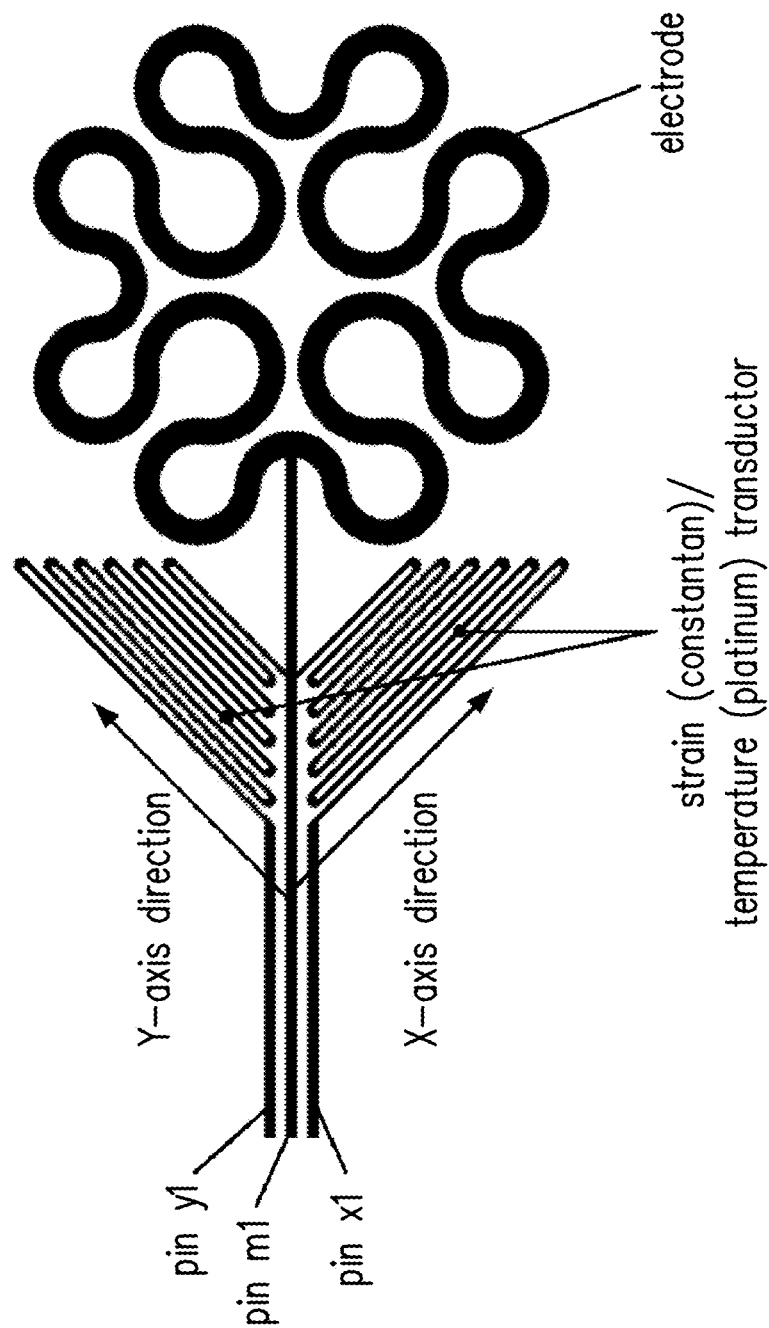
FIG. 15 is a schematic diagram of a structure of an upper/lower electrode layer according to a preferred embodiment of the disclosure.
Figure 16:
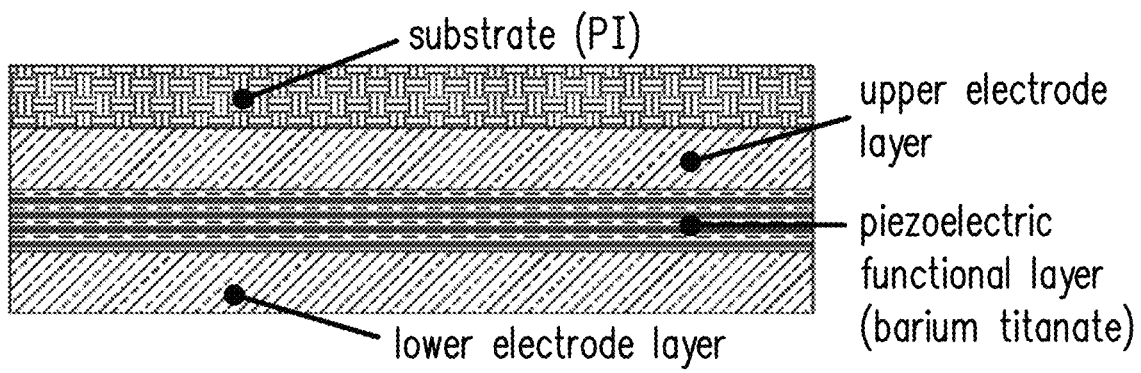
FIG. 16 is a schematic diagram of a cross-sectional structure of a flexible metamorphic sensor according to a preferred embodiment of the disclosure.

The upper electrode layer and the lower electrode layer have the same structure. As shown in FIG. 15 and FIG. 16, the upper/lower electrode layer includes three electrode parts. A first electrode part is connected at both ends to form a closed serpentine structure. The first electrode part is disposed with a first terminal. The second part and the third part have the same structure, which is a metallic foil shape distributed on both sides of the first terminal. The included angle between the second part and the third part is 90 degrees. In the embodiment, the direction of the second electrode part is in the X-axis direction, and the direction of the third electrode part is in the Y-axis direction. One ends of the second part and the third part are connected to the first terminal, and the other ends are respectively disposed with a second terminal and a third terminal. The piezoelectric layer is disposed between the upper electrode layer and the lower electrode layer. The piezoelectric layer has the same structure as the first electrode part.

When measuring the resistance between two of the three terminals of the upper/lower electrode layer, the upper/lower electrode layer serves as a resistance sensor. When measuring the voltage or capacitance between the first terminal on the upper electrode layer and the first terminal on the lower electrode layer, the sensors respectively serve as a piezoelectric sensor and a capacitive sensor.

In the embodiment, the terminals of the upper electrode layer are m1, x1, and y1, and the terminals of the lower electrode layer are m2, x2, and y2. The m1 and m2 are the terminals of the first electrode part, which may measure the resistance between the electrode layers m1 and x1, and m1 and y1, or the resistance between the electrode layers m2 and x2, and m2 and y2.

Figure 17:
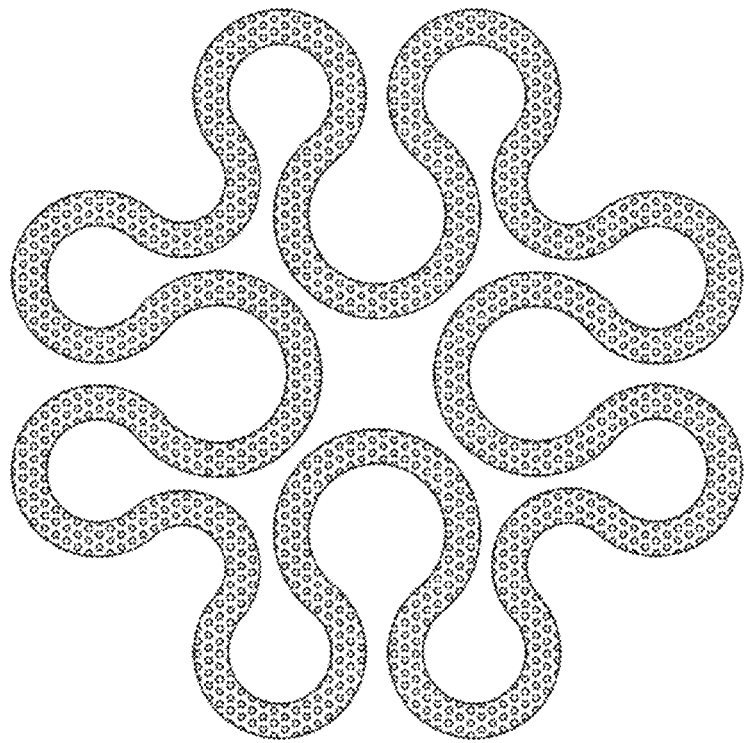
FIG. 17 is a schematic diagram of a structure of a first electrode part according to a preferred embodiment of the disclosure.

Further, as shown in FIG. 17, both the first electrode part and the piezoelectric layer are disposed with multiple micropores with a pore diameter of 100 nm to 500 nm. When water vapor enters the pores, the dielectric constant of the piezoelectric layer is changed, thereby changing the capacitance between the upper electrode layer and the lower electrode layer.

Further, the material of the upper electrode layer is preferably gold, platinum, silver, titanium, niobium, or tantalum.

Further, the material of the lower electrode layer is preferably platinum, gold, silver, titanium, niobium, or tantalum. The material of the upper electrode layer and the material of the lower electrode layer are different, otherwise the temperature and strain cannot be decoupled.

Further, the material of the piezoelectric layer is preferably piezoelectric material such as barium titanate, sodium bismuth titanate, potassium sodium niobate, barium strontium niobate, sodium barium niobate, bismuth titanate, calcium bismuth titanate, or titanic acid bismuth strontium. Piezoelectric transduction is a self-powered transduction manner that does not require an external power supply. Compared with the conventional piezoelectric material, PZT, piezoelectric transduction has biocompatibility. Compared with zinc oxide and poly (vinylidene fluoride)

(PVDF), piezoelectric transduction has a higher piezoelectric performance. The structure is designed as a serpentine structure, on which a micropore array structure is disposed.

The material of the substrate is a flexible material such as PI, PET, or PDMS.

Further, the thickness of the upper electrode layer is preferably 100 nm to 200 nm, and the thickness of the lower electrode layer is preferably 100 nm to 200 nm.

The metallic foil structure may be configured to measure temperature and strain and compensate the errors caused by each other. Based on such, the material of the lower electrode layer may be selected as metal platinum, gold, silver, titanium, niobium, or tantalum with larger temperature coefficient of resistance and biocompatibility. The material of the upper electrode layer may be selected as metal gold, platinum, silver, titanium, niobium, or tantalum with higher strain sensitivity coefficient. At the same time, in order for the sensor to have good stretchability, the electrode structure is designed as a serpentine structure to ensure a larger duty ratio and stretchability.

The applications of the metamorphic sensor for monitoring physiological information according to the disclosure in measuring temperature, strain, vibration, sound wave, hydration, electric potential, electrical stimulation, and Young's modulus, are specifically as follows.

Figure 18:
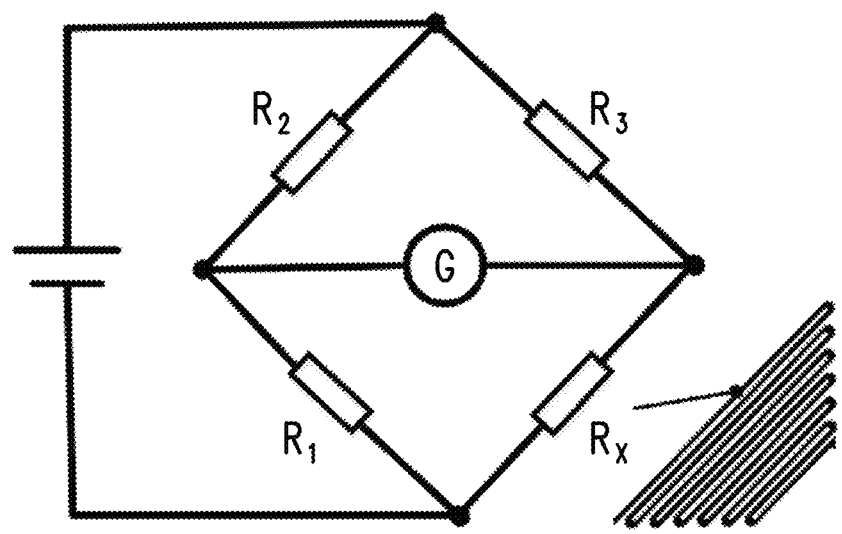
FIG. 18 is a principle diagram of a Wheatstone full-bridge circuit for strain and temperature detection according to a preferred embodiment of the disclosure.

(1) Temperature detection and strain detection: As shown in FIG. 18, the second electrode part of the metallic foil structure is a resistive-temperature-strain sensor unit. The resistance values of the second electrode parts (or third electrode parts) of the upper and lower layers are simultaneously measured to obtain the temperature and the strain in the corresponding axis direction of the object at the attachment position of the device. At the same time, the resistance values of the second electrode part and the third electrode part of the upper and lower layers are measured to obtain the strain in the X-axis and Y-axis directions generated at the attachment position, so as to obtain two sets of temperature values. A mean calculation may be performed, so that the measured temperature is more accurate.

Temperature and strain simultaneously affect the resistance of the two metal metallic foil structures of the upper and lower electrode layers. An equation set may be formed by combining the resistance calculation equations of the metals of the upper and lower electrode layers. The equation set is decoupled to obtain accurate temperature and strain values. The influence of the distance between the upper and lower electrodes and a strain neutral layer due to the thickness of the piezoelectric layer is considered. The strain neutral layer is a surface where the strain (or stress) is zero. After a plate or a cantilever beam is bent, the layers of different thickness have different stresses. For example, when bending downward, the thickness of the in-plane position of the cantilever beam closer to the top is the effect of tension, and the in-plane position closer to the bottom is the effect of pressure. There must be a surface without any stress between the tension and pressure, which is referred to as the neutral layer or the neutral plane. FIG. 9 shows the Wheatstone bridge circuit used for resistance detection. In addition, a more accurate temperature value of the temperature detection may be obtained by solving respectively using the upper and lower electrodes of the gate structures in the X-axis and Y-axis directions to obtain the mean value. Multiple metamorphic units may be combined to implement change in the distribution of temperature and strain fields on the surface of biological tissue or organ.

The temperature detection may evaluate the state of the object. When attached to a position such as the joint of an animal body, the movement state of the animal limb may be obtained using the strain detection function.

The resistance between x1 and m1, y1 and m1, x2 and m2, and y2 and m2 are measured, that is, two sets of resistance in the X-axis and Y-axis directions are obtained by respectively detecting the upper and lower electrode layers, which are decoupled to obtain two sets of temperature values and the strain value in the X-axis direction and the strain value in the Y-axis direction.

(2) Vibration detection and sound wave (vibration) stimulation: The first electrode parts of the serpentine structure of the upper and lower electrode layers form a piezoelectric sensor with the piezoelectric layer therebetween. Micropores may reduce the vertical rigidity of the functional layer in the area and increase the sensitivity of the piezoelectric unit. The vibration detection and sound wave stimulation functions may be respectively implemented using the positive and reverse piezoelectric effects.

The vibration detection function may be used to detect the breathing of the object, the internal pressure change of the object, the peristaltic characteristics of the object, the contraction state of the object, etc. The acoustic wave stimulation may apply tactile feedback to the skin of the object to form a two-way interaction with other sensor functions.

For the vibration detection, vibrations cause change in the piezoelectric signal. The positive and negative electrodes of a path are respectively connected to the terminal m1 or m2 adjacent to a serpentine structure area on the same side of the upper and lower electrodes, so as to implement the acquisition of the voltage signal generated at the serpentine structure area. The connection manner of the sound wave detection is the same as the path of the vibration detection. The positive and negative electrodes of the connection path are used to apply an electrical signal to a piezoelectric functional layer. An inverse piezoelectric effect is used to form an acoustic wave (or vibration), so as to implement functions such as tactile feedback.

Figure 19:
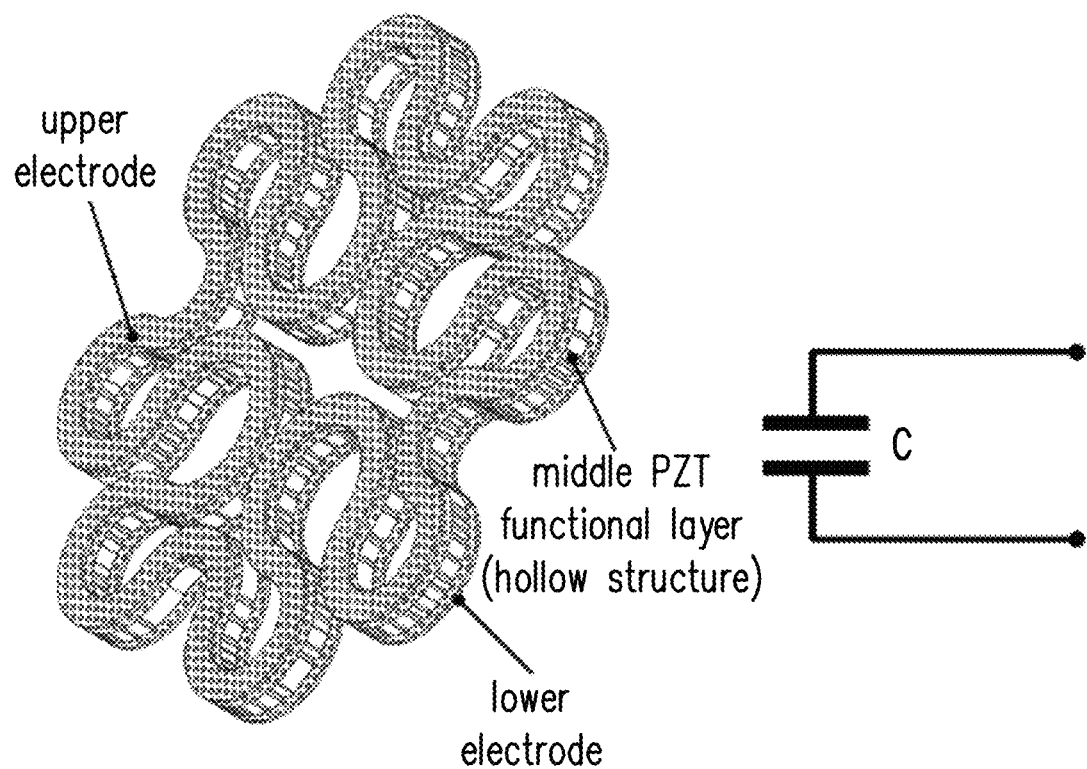
FIG. 19 is a principle diagram of a three-dimensional structure and equivalent circuit of a hydration detection unit according to a preferred embodiment of the disclosure.

(3) Hydration detection: As shown in FIG. 19, the winding zig zag structures of the upper and lower electrode layers and the piezoelectric layer having the micropore array structure therebetween forms a capacitive sensor. The lower electrode layer naturally forms the same micropore distribution at the micropore array structure area of the functional area during preparation, which does not form a short circuit with the lower electrode layer. The micropores enable gas molecules of water on the surface of the object to infiltrate, thereby changing the capacitance value. The hydration value at the attachment position of the device is obtained through measuring the capacitance value.

When the sensor is attached to the surface of the object, change in the capacitance between the terminals m1 and m2 may be measured to evaluate the hydration status of the object.

For the detection of electric potential, electrical stimulation, and Young's modulus, multiple metamorphic sensors may be adopted, specifically as follows.

(1) Electric potential detection and electrical stimulation: The lower electrode layer is directly attached to the surface of the object. The electrode part of the stretchable serpentine structure may ensure outstanding stretchability (the structure can effectively avoid stress concentration) and excellent electrical properties (working area of effective electrode has higher duty ratio), which may serve as an electric potential detection electrode and an electrical stimulation electrode. Multiple metamorphic units cooperate to serve as multiple electric potential measurement points and ground electrodes to implement multi-point bioelectric potential detection function. The metamorphic units may also be combined two by two to apply electric field stimulation to the object.

Multiple metamorphic sensors are selected to be attached to different positions on the surface of the object. The function of potential detection can be realized by measuring the potential difference between the lower electrodes of different multiple metamorphic sensors. On the contrary, the function of electrical stimulation can be realized by applying electrical signals to the lower electrodes of different multiple metamorphic sensors.

For the detection of electric potential at different positions. First, the number of electric potential detection points a is determined. The positive electrodes of a channels of various signal gating circuits are respectively connected to the terminal m2 adjacent to the serpentine structure area of the lower electrode layer of the metamorphic unit. The negative electrodes of the channels are connected to the same ground electrode (a place with relatively stable electric potential is selected to attach a single metamorphic unit as the ground electrode according to the above connection manner) to implement the electric potential detection of the multi-point object. When electric stimulation is applied, the lower electrode M2 of every two multiple metamorphic sensors should be used as a group to form electrode pairs, and the current waveform or voltage waveform should be applied to electrode pairs.

Figure 20:
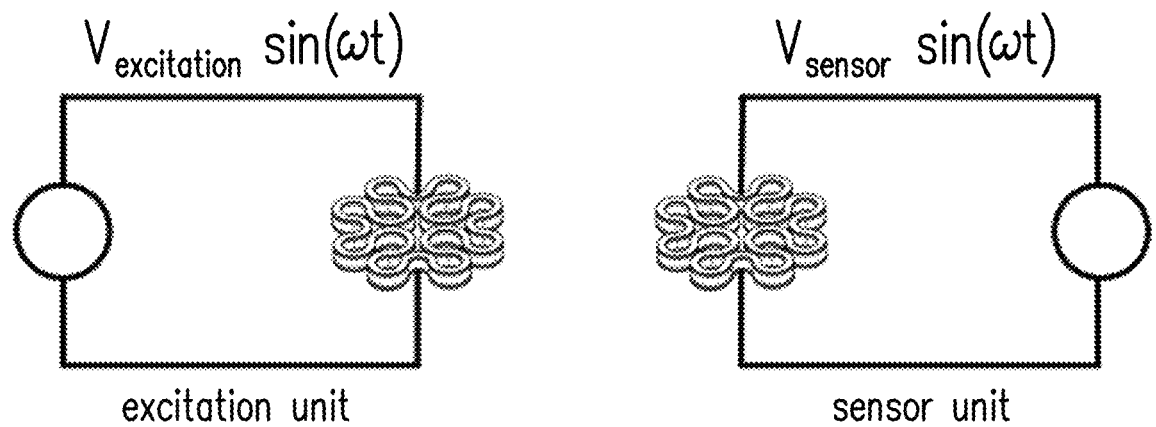
FIG. 20 is a principle diagram of Young's modulus detection according to a preferred embodiment of the disclosure.

(2) Young's modulus detection: As shown in FIG. 20, one metamorphic sensor serves as an excitation application unit. Another adjacent metamorphic sensor serves as a vibration detection unit. When the Young's modulus range of the object is at 1 kPa to 1000 kPa, there is the following formula:

$$\frac{V_{sensor}}{V_{actuator}} = \frac{e_{31}^2 A_{piezo} h_{piezo}}{k_{33} E_{sub} h_{sub} d^2} G\left(\frac{E_{tissue} d^3}{E_{sub} h_{sub}^3}\right)$$

Where, $V_{sensor}$ is the voltage signal received by the sensor, $V_{actuator}$ is the voltage signal applied by the excitation unit, $e_{31}$ and $k_{33}$ are respectively the piezoelectric coefficient and the dielectric coefficient of the piezoelectric material, $A_{piezo}$ and $h_{piezo}$ are respectively the area and the thickness of the piezoelectric functional area, $E_{sub}$ and $E_{tissue}$ are respectively the Young's modulus of the substrate and the Young's modulus of the object, $h_{sub}$ is the thickness of the substrate PI layer, and d is the distance between the excitation unit and the sensor unit. The Young's modulus of the object may be calculated through the formula.

The electric potential detection function may be used to detect biopotential such as intestinal electrocardiogram, electrocardiogram, electroencephalogram, and myoelectricity. The electrical stimulation function may be used to apply beneficial stimulation to nerves to promote organ contraction or inhibit organ contraction, and may also control the limb movement of the animal body, accelerate the recovery of the limb movement function, and form electrical tactile on the surface of the skin. The Young's modulus detection evaluates the cancer situation, inflammation condition, and skin health condition of the biological tissue or organ.

Embodiment 3

Figure 21:
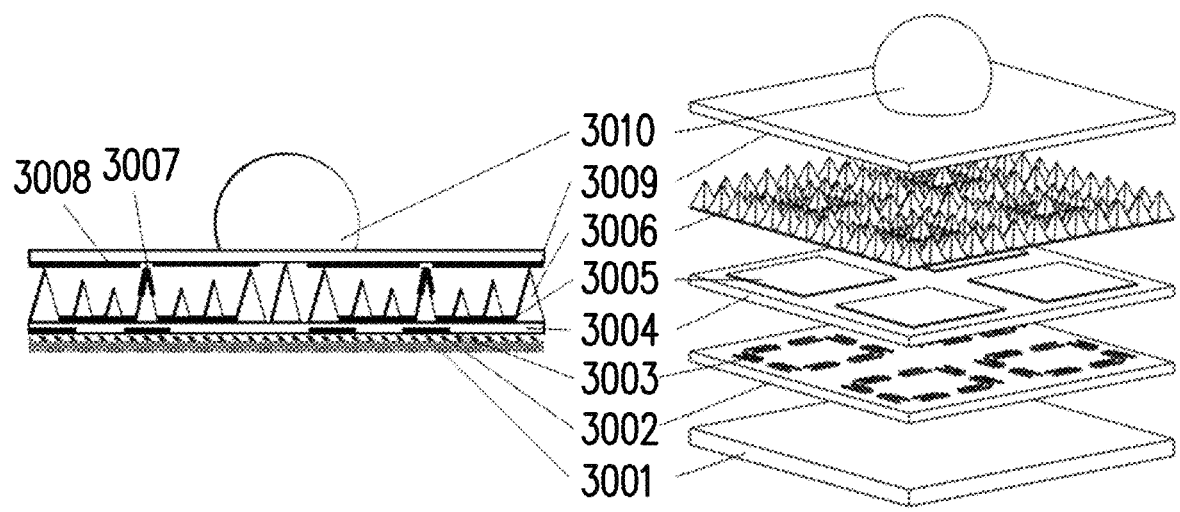
FIG. 21 is a schematic diagram of a structure of a multi-modal metamorphic sensor formed by combining 2×2 modules according to a preferred embodiment of the disclosure.

In the embodiment, a bottom electrode 3005 serves as the lower electrode layer, a top electrode 3008 serves as the upper electrode layer, and the spacer layer is the intermediate dielectric layer 3006. As shown in FIG. 21, the metamorphic sensor includes a capacitor layer. The capacitor layer sequentially includes from bottom to top a bottom flexible substrate 3004, a bottom electrode 3005, an intermediate dielectric layer 3006, a conductive electrode 3007, a top electrode 3008, and a top flexible substrate 3009. The bottom flexible substrate 3004 and the top flexible substrate 3009 serve as the substrate, are isolated from the outside, and adopt flexible insulating materials. The intermediate dielectric layer 3006 is composed of multi-level micro pyramid structures with different heights, which increases the sensitivity and pressure measuring range. The top electrode 3008 is composed of two spiral coils and a flat electrode. Each flat electrode is connected to one spiral coil. The terminals of the two spiral coils relatively form a notch. The conductive electrode 3007 is disposed on the corresponding pyramidal flexible protrusion right under the notch. When the conductive electrode is embedded in the notch, the two flat electrodes are conducted to form a resistor for measuring the temperature of the object that exerts pressure on the metamorphic sensor. The two flat electrodes constitute a planar capacitor, which is configured to measure the distance when the object approaches. The bottom electrode 3005 is a flat electrode. The bottom electrode 3005 and the top electrode 3008 constitute a parallel plate capacitor, which changes under the effect of pressure and is configured to measure static pressure.

The metamorphic sensor also includes a substrate 3001 and a piezoelectric layer. The substrate 3001 is a carrier of other components in the metamorphic sensor. The piezoelectric layer includes a piezoelectric material layer 3002 and an electrode layer 3003 located on top. The piezoelectric material layer 3002 is configured to sense pressure, and convert the applied pressure into electric charge. The electrode layer 3003 is configured to transmit the electric charge. The electrodes are disposed in the form of interdigitated pairs. Two sets of orthogonal interdigital transducer pairs are disposed on the electrode layer 3003. Each set of the orthogonal interdigital transducer pair includes a pair of lateral interdigital transducers and a pair of longitudinal interdigital transducers. One of two interdigital transducers in the pair of lateral/longitudinal interdigital transducers serves as a signal input, and the other one serves as a signal output, which are configured to measure the degree of bending. When both interdigital transducers serve as the signal output, the transducers are configured to measure the vibration signal.

The metamorphic sensor further includes a micro dome 3010. The micro dome 3010 is disposed at the center of the upper surface of the capacitor layer, and serves as a medium for the metamorphic sensor to contact the external environment.

The metamorphic sensor including the substrate, the piezoelectric layer, and the capacitor layer serves as a module. As shown in FIG. 21, a multi-functional flexible sensor array is formed by combining 2×2 modules. The center of the upper surface of the capacitor layer of the array is disposed with the micro dome 3010.

When the object approaches the metamorphic sensor, the planar capacitor composed formed by the two flat electrodes on the top electrode layer 3008 changes. The distance between the object to be grasped and the metamorphic sensor is quantified through measuring the change in capacitance, thereby implementing the measurement of distance.

The bending of a mechanical hand causes the path between the interdigital transducer pair of the piezoelectric layer to change. Through measuring the voltage amplitude and phase of the reception interdigital transducers therein, the measurement of the degree of bending of the metamorphic sensor is implemented.

The metamorphic sensor is pressed, causing the conductive electrode to be embedded in the notch. The temperature change of the object to be grasped causes the resistance formed by the two flat electrodes to change. The temperature of the object to be grasped is obtained through measuring the resistance at both ends of the two flat electrodes, so as to implement the temperature measurement.

The pressure and shear stress of the mechanical hand when grasping the object causes the capacitance between the top electrode and the bottom electrode to change. Through measuring the trend and magnitude of change of 4 capacitors combined by the 2×2 array, the magnitude and direction of the pressure and the shear stress are decoupled.

At the same time, the interdigital transducer pairs of the piezoelectric layer all serve as the output electrodes, so as to sense the dynamic pressure signal during the grasping process.

Figure 22:
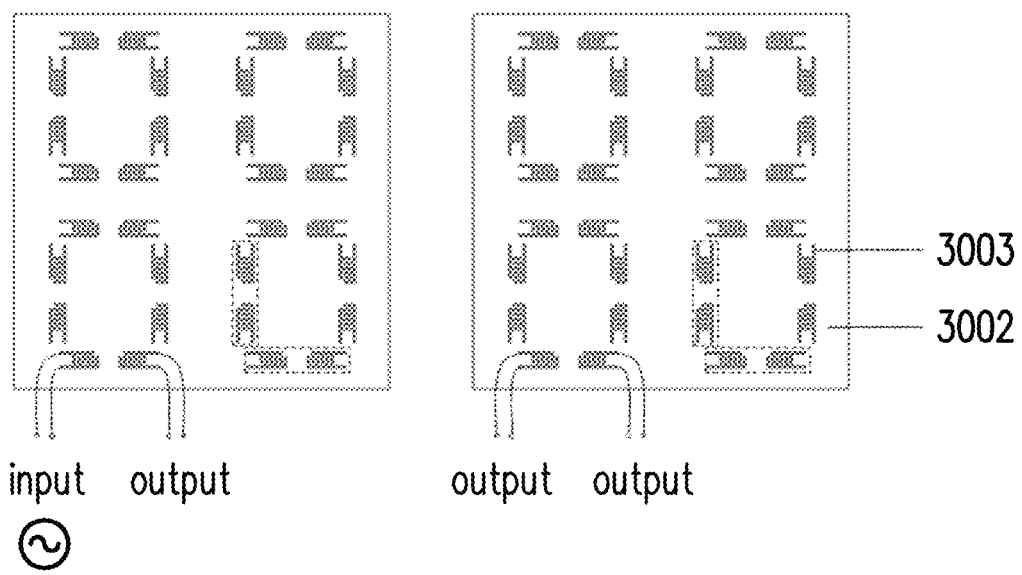
FIG. 22 is a top view of an electrode layer 3 of the multi-modal metamorphic sensor formed by 2×2 modules in FIG. 21 according to a preferred embodiment of the disclosure, where (a) is a schematic diagram of signal input and output for bending measurement, and (b) is a schematic diagram of signal output for vibration measurement.

FIG. 22 is a top view of the electrode layer 3003 of the sensor array formed by 2×2 modules in FIG. 21. In FIG. 22, (a) shows that when used in bending measurement, one of the two interdigital transducers in a pair of lateral/longitudinal interdigital transducers serves as the signal input part, and the other one serves as the signal output part. One of the transducers is referred to as the input transducer, which converts the input electrical signal into an acoustic signal through the inverse piezoelectric effect. The acoustic signal propagates along the surface of the substrate, and is finally converted by the other transducer, referred to as the output transducer, into electrical signal to be outputted.

In FIG. 22, (b) shows that when used as vibration sensors, both of the two interdigital transducers serve as outputs parts. Under the effect of pressure, the piezoelectric effect will generate electric charge on the two electrodes, and the amount of electric charge generated is proportional to the vibration amplitude.

For isotropic piezoelectric materials, the output voltage of the interdigital transducer pair is related to the geometric parameters thereof, specifically as follows:

$$v_{out}(t) = h \sum_{n=0}^{N} \sum_{m=0}^{M} v_{in}\left(t - \frac{L + ma + na}{V_R}\right)$$

Where, h is the constant related to the piezoelectric material and the physical properties thereof, t is the time, $V_R$ is the propagation speed of the Rayleigh wave, L is the distance between the interdigital electrode of the input transducer connected to the input voltage and the interdigital electrode of the output transducer connected to the output voltage, a is the distance between the interdigital electrodes, m and n are respectively the number of interdigital electrodes of the input transducer and the output transducer, $v_{in}$ is the excitation voltage of the input transducer, and $v_{out}$ is the output voltage of the output transducer. As can be seen from the above formula, the output voltage changes as the size parameters a and L of the transducer pair change. Bending and deformation along the direction of the transducer will cause the anisotropy of the piezoelectric material, and affect the propagation of surface acoustic wave, thereby changing the amplitude and phase of the output voltage. The amplitude value and phase of the voltage received by the output transducer are proportional to the radius of bending, that is, a single pair of transducer pair may characterize one-dimensional bending morphology along the direction of the transducer. According to the principle of superposition, any three-dimensional surface that does not overlap may be decomposed into two two-dimensional surfaces with unidirectional bending. Therefore, two pairs of orthogonal transducers may be adopted to analyze the three-dimensional deformation.

Figure 23:
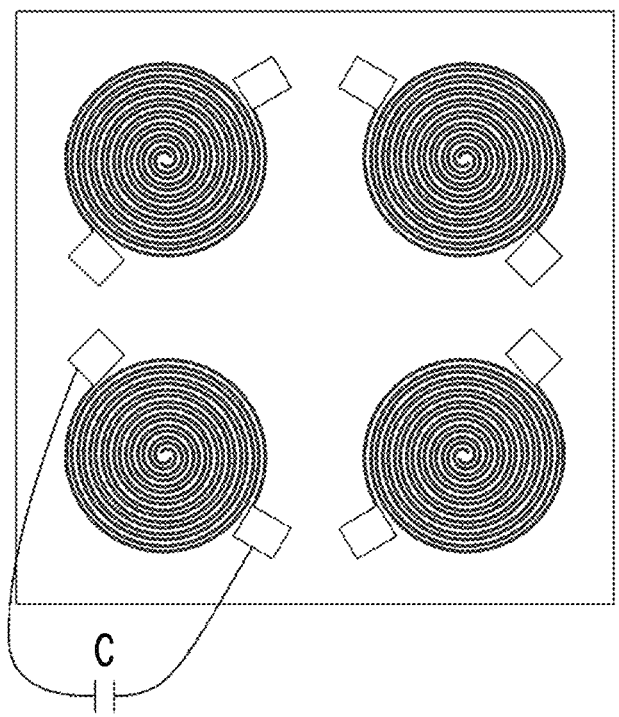
FIG. 23(a) is a top view of a top electrode layer of a capacitor layer of the multi-modal metamorphic sensor formed by 2×2 modules in FIG. 21 according to a preferred embodiment of the disclosure.
FIG. 23(b) is a schematic diagram of change in capacitance of the top electrode when an object approaches the sensor according to a preferred embodiment of the disclosure.
Figure 23:
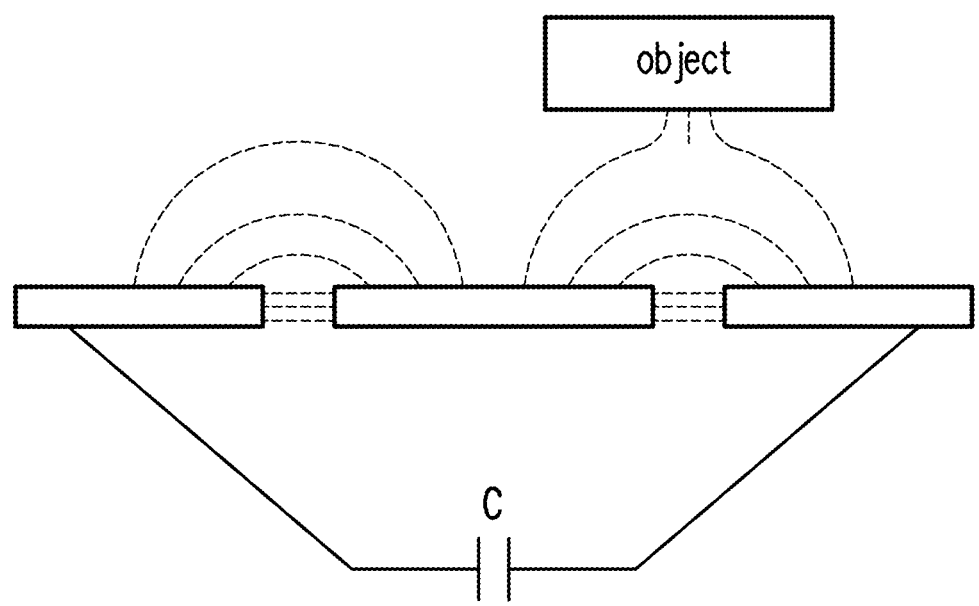

FIG. 23(a) is a top view of a top electrode 8 of a sensor array formed by the 2×2 modules in FIG. 21. FIG. 23(b) is a schematic diagram of the change in capacitance of the top electrode when the object approaches the sensor. The top electrode 3008 of the capacitor layer is composed of a pair of spiral electrodes, constitutes a planar capacitance sensor, and is configured to measure the distance of the objects approaching. The magnitude of a planar capacitance C is related to the size parameters of the electrodes and the electric field distribution near the electrodes. When the object approaches, the electric field distribution near the electrodes change, thereby causing the capacitance value to change. Also, the amount of change in the planar capacitance C changes as the distance of the object approaching changes. In addition, the physical properties of different objects are different, causing the amount of change in the planar capacitance to be also different when approaching. Therefore, the same may also be used for identification of object type.

Figure 24:
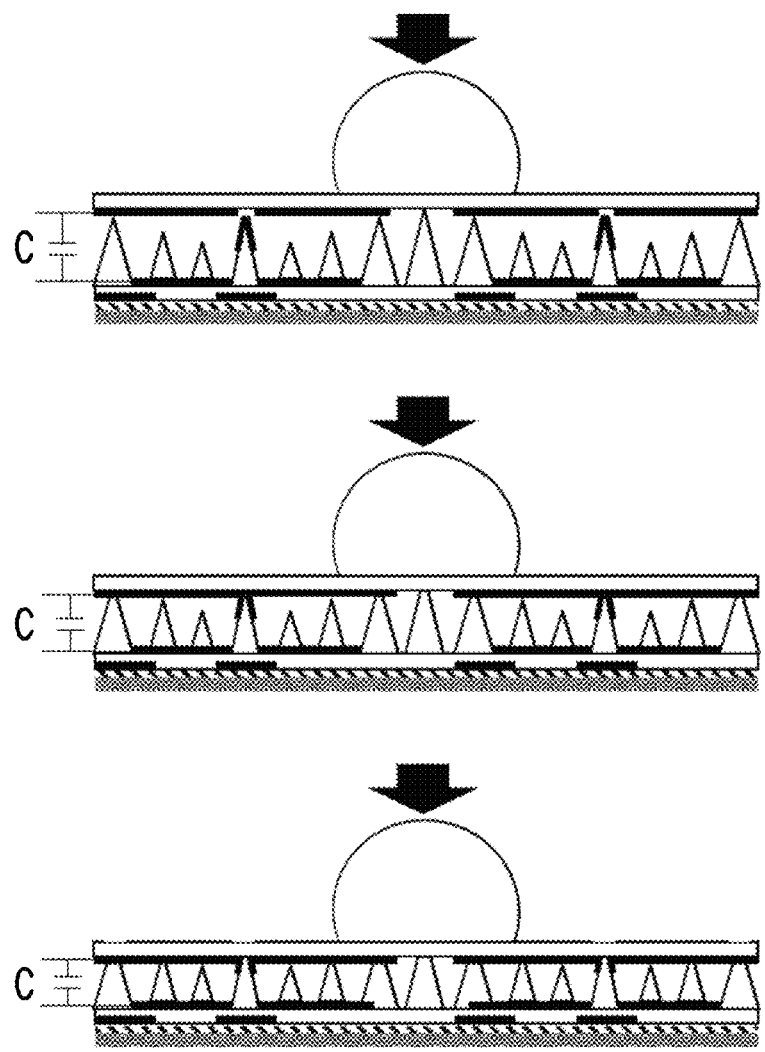
FIG. 24 is a schematic diagram of a multi-functional sensor for static pressure measurement according to a preferred embodiment of the disclosure.
Figure 25:
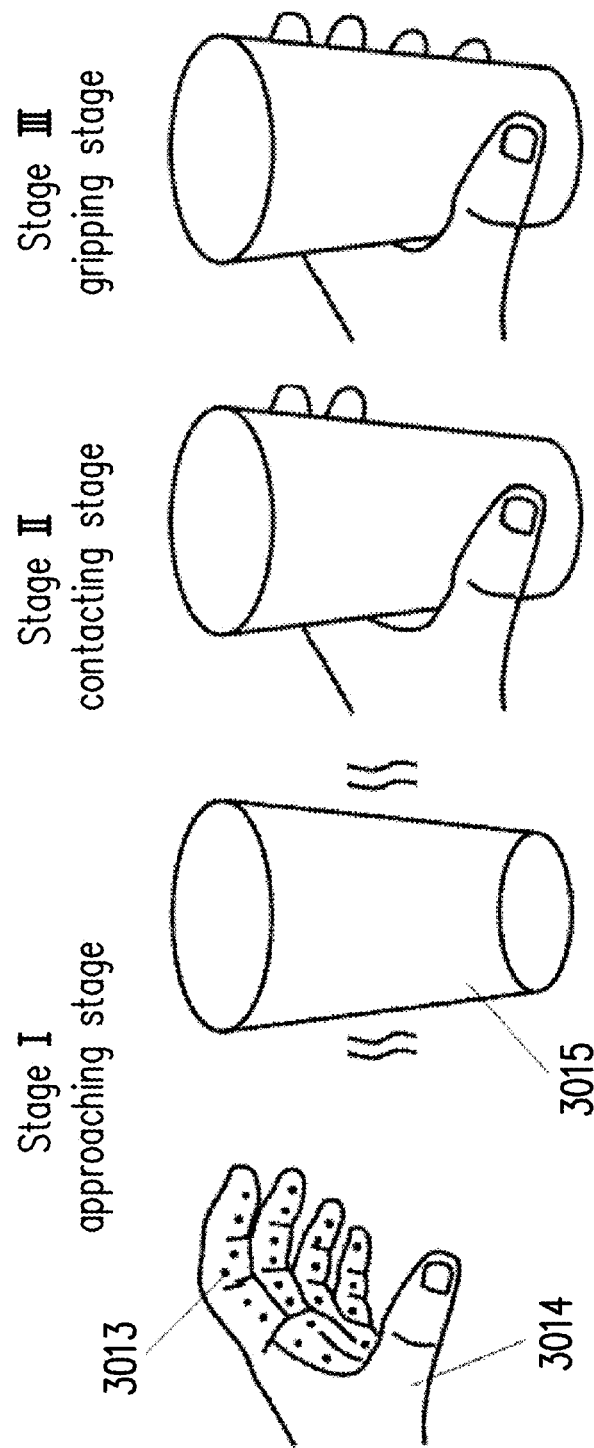
FIG. 25 is a schematic diagram of an application of a combination of multiple sensor networks according to a preferred embodiment of the disclosure.

FIG. 24 is a schematic diagram of a multi-functional transductor unit for static pressure measurement according to the disclosure. The capacitive layer of the transductor unit is used in static pressure measurement. The capacitive layer includes a bottom electrode, a dielectric layer, and a top electrode. The bottom electrode and top electrode constitute a parallel plate capacitor for static pressure measurement. Under the effect of pressure, the intermediate dielectric layer is deformed due to pressure, the distance between the two electrodes decreases, and the parallel plate capacitance also increases. Specifically, as follows:

According to the parallel plate capacitance formula:

$$C = \frac{\varepsilon_0 \varepsilon_r A}{d(\Delta p)}$$

Where, $\varepsilon_0$ is the dielectric constant of vacuum, $\varepsilon_r$ is the relative dielectric constant of the intermediate dielectric layer, A is the direct area of the upper and lower electrodes, and d is the distance between the upper and lower electrodes, that is, the thickness of the intermediate dielectric layer changes with pressure. In order to increase the sensitivity and range of the pressure sensor, the intermediate dielectric layer adopts a multi-level micro pyramid structure with different heights. Under the small pressure, the highest pyramid first contacts the top electrode layer. As pressure increases, the top electrode layer continues to move downward to contact the next highest pyramid, and then successively proceed downward. Compared with the traditional contoured pyramidal microstructure, the tensile rigidity of the intermediate dielectric layer is reduced, and the sensitivity of pressure measurement is improved. At the same time, the presence of multiple levels prevents the sensor from entering the saturation region too quickly, and resulting in a small range. In addition, since the contact area of the pyramidal microstructure with the top electrode after being deformed by pressure is reduced, the hysteresis of the sensor is also reduced.

Under the positive pressure, the electrode part of the middle pyramid of the intermediate dielectric layer of the transductor unit contacts the top electrode 3008 of the capacitor layer, so that the spiral electrode pair of the top electrode is connected as a temperature sensor, whose resistance changes with different temperatures, so as to implement temperature measurement. Therefore, the top electrode should adopt a temperature-sensitive material, which is preferably platinum with good conductivity. At the same time, the double spiral structure design increases the sensitivity of temperature measurement. Therefore, the top electrode of the capacitor layer has two working modes, respectively configured to measure the object approaching and temperature, and pressure serves as the "switch" for switching between the two modes. The resistance measurement of the top electrode at different periods is implemented through the switching of the switch. The capacitance between the top electrode and the bottom electrode is measured at different periods to implement the measurement of a three-way force and temperature at the same position.

Four sensor units form a 2×2 small array to implement the three-way force measurement, that is, normal stress in vertical direction (z direction), shear stress in the horizontal front-back direction (y direction), and shear stress in the horizontal left-right direction (x direction). In order to further increase the sensitivity of force measurement, a circular micro-dome is added to the top part, which is conducive to the concentration of stress. The two top electrode and bottom electrode located at the front and arranged in the horizontal left-right direction constitute capacitors $C_1$ and $C_2$. The two top electrode and bottom electrode located at the back and arranged in the horizontal left-right direction constitute capacitors C3 and C4. The three-dimensional stress in any direction may be decomposed into stress $\tau_x$, $\tau_y$, and $P_z$ along the x, y, and z directions, and the parallel plate capacitors are expressed as:

$$C_1 = \frac{\varepsilon_0 \varepsilon_r A}{d - \Delta d_1}, C_2 = \frac{\varepsilon_0 \varepsilon_r A}{d - \Delta d_2}$$
$$C_3 = \frac{\varepsilon_0 \varepsilon_r A}{d - \Delta d_3}, C_4 = \frac{\varepsilon_0 \varepsilon_r A}{d - \Delta d_4}$$

Where, $\varepsilon_0$ is the dielectric constant of vacuum, $\varepsilon_r$ is the relative dielectric constant of the intermediate dielectric layer, d is the initial thickness of the intermediate dielectric layer, A is the initial direct area between the two electrodes of the parallel plate capacitor, and $\Delta d_1$, $\Delta d_2$, $\Delta d_3$, and $\Delta d_4$ are respectively the distance drop between the two electrodes of the capacitors $C_1$, $C_2$, $C_3$, and $C_4$ under pressure. Under the positive pressure along the z direction, the distances between the electrodes of the capacitors $C_1$, $C_2$, $C_3$, and $C_4$ all decrease and the capacitance increases. Under the effect of shear stress along the x direction, the distances between the electrodes of the capacitors $C_1$ and $C_3$ decrease and the capacitance increases, while the distances between the electrodes of the capacitors $C_2$ and $C_4$ increase and the capacitance decreases, so that the direction of shear stress may be determined. In the same way, the shear force in the front-back direction will cause similar change. Under the three-way force, the magnitude and direction of the three-way force may be decoupled by combining the trend and magnitude of change of the four capacitors.

In order to implement a large-area sensor network, a flexible hollow "island-bridge" structure design is adopted. The island are multi-functional flexible transductor units composed of four multi-functional transductor units in the disclosure, which can collectively form with the surface of the robotic hand. The bridge connects each sensor unit and is composed of a stretchable winding zig zag lead wire, so that the sensor network has a great stretchability, and can adjust the gap between each unit according to requirements to change the measurement density. In order to further increase the area of the electronic skin, after the stretched sensor network is attached onto the robotic hand, the terminals of the circuit of each sensor network are interconnected by adopting electro-jet printing to form a larger area of electronic skin. Such manner may be arbitrarily expanded according to different application objects.

The process of grasping and perceiving a cup of hot water by a robotic hand attached with a flexible electronic skin formed by the metamorphic sensor of the disclosure is mainly divided into three stages. Stage I is the approaching stage, Stage II is the contacting stage, and Stage III is the gripping stage. In Stage I, the mechanical hand needs to adjust the posture of the hand according to the shape of the cup. The piezoelectric layer is mainly configured to measure the bending of the robotic hand, that is, one of the pair of interdigital transducers serves as the input transducer and the other one serves as the output transducer, so as to implement the real-time monitoring of the posture of the mechanical hand. At this time, the electronic skin is not subjected to the effect of positive external pressure. The top electrode of the capacitor layer serves as a planar capacitance sensor. When the mechanical hand gradually approaches the water cup, the electric field distribution of the planar capacitor changes, thereby changing the capacitance value thereof, so as to implement the monitoring of the distance between the mechanical hand and the water cup. At Stage II, the mechanical hand is just in contact with the water cup. At this time, under the positive pressure, the electrodes on the middle pyramid of the middle node layer of the capacitor layer is in contact with the top electrode of the capacitor layer, so that the planar capacitance sensor is converted into a resistive temperature sensor, so as to implement the temperature measurement of the water cup. At Stage III, the bottom electrode, the top electrode, and the multi-layer pyramidal structure in the middle of the capacitor layer constitute the parallel plate capacitance sensor. The mechanical hand gradually grips the water cup. As the pressure increasing, the middle dielectric region of the capacitor layer is squeezed to change the capacitance, so as to implement the static pressure measurement. At this time, the top electrode also serves as a resistive temperature sensor. The time-sharing measurement of temperature and pressure at the same position is implemented through switching the circuit. The measurement unit of the three-way force is composed of four multi-functional sensor units. Under the effect of force in the horizontal direction, change in the parallel plate capacitors in the four sensor units are different. The magnitude and direction of the force in the horizontal direction may be determined through the decoupling of the algorithm. At this time, the interdigital electrode pairs of the piezoelectric layer are all used as outputs for perceiving the vibration signal.

The disclosure reduces the use of multiple lead wires of the sensor, improves measurement accuracy and measurement efficiency, and reduces measurement cost.

Generally speaking, compared with the prior art, the above technical solutions conceived by the disclosure can implement the following beneficial effects:

1. The disclosure provides a multi-modal field-programmable metamorphic sensor, which is mainly to provide a multi-modal smart and metamorphic sensor without changing the geometrical structure thereof. Through the switching between topology logic circuits, the selection of different functional structure electrodes is complete, so that the sensor works in different functional modalities, thereby completing the in-situ measurement requirement of one sensor for multiple physical quantities. Also, the space utilization of the sensor is greatly improved, and the integration and density of the sensor are improved to meet the high-density measurement requirement of the metamorphic sensors.

2. The structural design and material characteristics of each electrode layer of the metamorphic sensor according to the disclosure enables the sensor to have multiple functions to complete the measurement of the corresponding single physical quantity. Different electrode layers are combined and used to have other multiple functions to complete the measurement of other physical quantities. An output terminal of the field-programmable metamorphic sensor is selected through the corresponding topology logic circuit designed by the disclosure to complete the measurement of different physical quantities. The measurement of multiple physical quantities may be implemented through the installation of one metamorphic sensor.

3. The resource utilization of the circuit is improved through the design of the signal acquisition system according to the disclosure, which reduces the number of interfaces of the hardware acquisition circuit through the design of lead wire interconnection and switching circuit. The switching circuit may selectively connect different lead wires of the sensor to the acquisition circuit according to requirements, so as to implement the measurement of physical quantities corresponding to different sensor modes. The switching circuit is used to effectively reduce the number of interfaces required by an acquisition chip, thereby reducing system cost.

4. Compared with traditional multi-functional sensor or integration method of multi-functional sensor in other fields, the disclosure implements rich functions while having simple structure, simple preparation process, and high integration. The disclosure can implement in-situ unidirectional and bidirectional interaction, and solve the issues of low integration, excessive occupation of system resources, and complicated staggering of lead wires, etc. The effective control of thickness and area size can reduce the influence of the device on the physiological function of the object. In short, the structural design and the design of relevant circuit system of the metamorphic sensor are important means to implement a new generation of composite and highly integrated flexible electronics, which is also the developmental trend of flexible electronics catered to market demand.

It is easily understood by persons skilled in the art that the above are only the preferred embodiments of the disclosure and are not intended to limit the disclosure. Any modifications, equivalent replacements, improvements, etc. made within the spirit and principle of the disclosure should all be included in the protection scope of the disclosure.

What is claimed is:

1. A multi-modal field-programmable metamorphic sensor having a multi-layer structure, wherein the multi-layer structure comprises an upper electrode layer, a spacer layer, and a lower electrode layer, at least one of the upper electrode layer and the lower electrode layer is a sensor A, the spacer layer is disposed between the electrode layers, a sensor B is formed through forming a structure of electrode layer-spacer layer-electrode layer structure, when detecting an object under test, measurement of different physical quantities of different objects is implemented through switching between the sensor A and the sensor B; in addition, the metamorphic sensor serves as a single cell, and a plurality of single cells are combined to form a multi-cell sensor, wherein the upper electrode layer serves as a first electrode, the lower electrode layer serves as a third electrode, a second electrode is further disposed between the upper electrode layer and the lower electrode layer, the spacer layer comprises a dielectric layer and a piezoelectric layer, the dielectric layer is disposed between the first electrode and the second electrode, the piezoelectric layer is disposed between the second electrode and the third electrode; the first electrode, the dielectric layer, and the second electrode form a capacitive sensor, and the second electrode, the piezoelectric layer, and the third electrode form a piezoelectric sensor; wherein the second electrode comprises two resistors, which are respectively a first resistor and a second resistor, the first resistor is bent and has a sensitive grating structure, so as to extend a length of the first resistor, the second resistor is distributed in parallel with the first resistor, two ends of the first resistor are disposed with terminals A and F, a terminal of the second resistor is disposed with a terminal D, the first resistor forms a resistance sensor, for reflecting a change in resistance through monitoring a resistance between the terminals A and F, and the first resistor and the second resistor collectively form a capacitance transducer, for reflecting a change in capacitance through monitoring a capacitance between the terminals A/F and D; and the third electrode comprises two resistors with different thermoelectric coefficients, which are respectively a third resistor and a fourth resistor, the third resistor has a metallic foil structure, the fourth resistor is connected to the third resistor and a thermocouple is formed at a connection point, two ends of the third resistor are disposed with terminals B and E, a terminal of the fourth resistor is disposed with a terminal C, the third resistor forms a resistance transducer, for reflecting a change in resistance through monitoring a resistance between the terminals B and C, the third resistor and the fourth resistor collectively form a thermocouple sensor, for reflecting a change in thermocouple through monitoring a thermopotential between the terminals B/E and C.

2. A multi-modal field-programmable metamorphic sensor according to claim 1, wherein the upper electrode layer preferably adopts an electromagnetic wave absorbing material for absorbing electromagnetic wave;

materials of the first resistor and the second resistor are the same, which is preferably a material with a strain sensitivity coefficient greater than 1.6, a resistivity greater than 0.25 $\mu\Omega\cdot mm$, and a temperature coefficient of resistance less than $40\times10^{-6}/°$ C., the sensitivity coefficient is high and kept constant, so that the first resistor is sensitive to strain, the resistivity is large to improve a signal-to-noise ratio and reduce an influence of resistance of a lead wire, the temperature coefficient of resistance is small to reduce sensitivity of the first resistor to temperature, so as to ensure that the first resistor only has high sensitivity to change in strain;

a material of the third resistor is preferably a material with a temperature coefficient of resistance greater than $3000\times10^{-6}/°$ C., and a material of the fourth resistor is preferably a material with a thermopotential greater than 5 $\mu V/°$ C. to the third resistor, so that the third resistor constitutes a resistance temperature detector (RTD), and the third and fourth resistors constitute a thermocouple temperature sensor to satisfy temperature measurements of different temperature ranges;

a thickness of the metamorphic sensor is preferably 20 μm to 30 μm;

required patterns of the first electrode, the second electrode, and the third electrode are obtained through sequentially photolithography technology, and then the first electrode, the second electrode, and the third electrode are obtained on the mask of shaped photoresist via magnetron sputtering or vacuum vapor deposition of corresponding metallic materials; and the first resistor is further connected to an additional resistor to increase an area coverage of the third electrode.

3. A sensor signal acquisition system based on a variable topology switching matrix, wherein the acquisition system comprises the multi-modal field-programmable metamorphic sensor according to claim 1, a control module, a multiplexer switch module, a variable topology switch module, a signal acquisition module, and a data processing module, wherein the multiplexer switch module is connected to the metamorphic sensor, each terminal on the metamorphic sensor corresponds to a plurality of lead wires in the multiplexer switch module, and according to a physical quantity to be measured, a corresponding lead wire is selected from the corresponding lead wires of each terminal for a measurement of the physical quantity to be measured, wherein a number of lead wires is equal to a number of physical quantities that each lead wire is used to measure;

the variable topology switch module is connected to the multiplexer switch module and the signal acquisition module, the variable topology switch module comprises a plurality of input ports, a plurality of output ports and a plurality of switches, the plurality of switches are disposed between the plurality of input ports and the plurality of output ports, and different lead wires are combined through on and off combinations of different switches, so as to implement measurements of different physical quantities;

the signal acquisition module is connected to the data processing module, and is configured to convert a signal from the variable topology switch module into a digital signal;

the data processing module is connected to the control module, and is configured to analyze the digital signal from the signal acquisition module and transmit an analyzed result to a controller;

the controller is respectively connected to the multiplexer switch module and the variable topology switch module, and is configured to control on and off of each switch in the multiplexer switch module and the variable topology switch module; and for a physical quantity P to be measured, the controller first determines the terminals A, B, . . . , I, . . . , N corresponding to the physical quantity to be measured on the metamorphic sensor, then determines and selects a lead wire IP, which measures a physical quantity P, connected to the terminal I in the multiplexer switch module, and finally determines and controls on and off of different switches in the variable topology switch module, thereby implementing combinations of lead wires AP, BP, . . . , IP, . . . , obtaining a signal of the physical quantity P to be measured at an output terminal of the variable topology switch module, and transmitting the signal of the physical quantity P to be measured to the controller through the signal acquisition module and the data processing module, so as to implement a measurement of the physical quantity P to be measured.

4. The sensor signal acquisition system according to claim 3, wherein the controller is further connected to the signal acquisition module and is configured to adjust gain and filter functions in the signal acquisition module, so that an acquired signal is clear and readable; in the multiplexer switch module, a plurality of lead wires corresponding to each terminal are disposed on a multiplexer, a corresponding lead wire for measurement is selected through on and off of switches in the multiplexer, a number of multiplexers is equal to a number of terminals of the metamorphic sensor, input ports in the variable topology switch module correspond one-to-one with the multiplexers, each input port comprises m sub-ports, where m is a number of lead wires in the multiplexer corresponding to the input port; the signal acquisition module comprises a signal processing unit and a signal conversion unit, wherein the signal processing unit is configured to amplify, filter, and compensate a signal from the variable topology switch module, so as to obtain a processed signal, and the signal conversion unit is configured to convert the processed signal to obtain a digital signal, and transmit the digital signal to the data processing module; the signal acquisition module further comprises a measurement unit, the measurement unit is one or more combinations of single-wire measurement, double-wire measurement, and multi-wire measurement; and the switch in the variable topology module is a multiplexer switch, single pole single throw switch, single pole double throw switch, single pole multi throw switch, or double pole double throw switch.

5. A multi-modal field-programmable metamorphic sensor having a multi-layer structure, wherein the multi-layer structure comprises an upper electrode layer, a spacer layer, and a lower electrode layer, at least one of the upper electrode layer and the lower electrode layer is a sensor A, the spacer layer is disposed between the electrode layers, a sensor B is formed through forming a structure of electrode layer-spacer layer-electrode layer structure, when detecting an object under test, measurement of different physical quantities of different objects is implemented through switching between the sensor A and the sensor B; in addition, the metamorphic sensor serves as a single cell, and a plurality of single cells are combined to form a multi-cell sensor, wherein the metamorphic sensor further comprises a substrate, the spacer layer is a piezoelectric layer, and the substrate is a carrier of the upper electrode layer, the lower electrode layer, and the piezoelectric layer, wherein the upper electrode layer and the lower electrode layer have a same structure, the upper/lower electrode layer comprises three electrode parts, a first electrode part is connected at two ends to form a closed winding zig zag shape, the first electrode part is disposed with a first terminal, a second electrode part and a third electrode part have a same structure, which is a metallic foil shape, distributed at two sides of the first terminal, an included angle between the second electrode part and the third electrode part is 90 degrees, one ends of both the second electrode part and the third electrode part are connected to the first terminal, and other ends are respectively disposed with a second terminal and a third terminal, the piezoelectric layer is disposed between the upper electrode layer and the lower electrode layer, and the piezoelectric layer and the first electrode part have a same structure; and when measuring a resistance between the first terminal and the second terminal or a resistance between the first terminal and the third terminal of the upper/lower electrode layer, the upper/lower electrode layer serves as a resistance sensor; and when measuring a voltage or a capacitance between the first terminal on the upper electrode layer and the first terminal on the lower electrode layer, the metamorphic sensor respectively serves as a piezoelectric sensor and a capacitive sensor.

6. A multi-modal field-programmable metamorphic sensor according to claim 5, wherein both the first electrode part and the piezoelectric layer are disposed with a plurality of micropores with a pore diameter of 100 nm to 1 μm, when gaseous water molecules enter the micropores, a dielectric constant of the piezoelectric layer is changed, thereby changing a capacitance between the upper electrode layer and the lower electrode layer, materials of both the upper electrode layer and the lower electrode layer are gold, platinum, silver, titanium, niobium, or tantalum, and the materials of the upper electrode layer and the lower electrode layer are different; a material of the piezoelectric layer is preferably barium titanate, sodium bismuth titanate, potassium sodium niobate, barium strontium niobate, barium sodium niobate, bismuth titanate, calcium bismuth titanate, or strontium bismuth titanate, a material of the substrate is preferably polyimide (PI), polyethylene terephthalate (PET), polyurethane (PU), or polydimethylsiloxane (PDMS), a thickness of the upper electrode layer is preferably 100 nm to 200 nm, and a thickness of the lower electrode layer is preferably 100 nm to 200 nm.

7. A sensor signal acquisition system based on a variable topology switching matrix, wherein the acquisition system comprises the multi-modal field-programmable metamorphic sensor according to claim 4, a control module, a multiplexer switch module, a variable topology switch module, a signal acquisition module, and a data processing module, wherein the multiplexer switch module is connected to the metamorphic sensor, each terminal on the metamorphic sensor corresponds to a plurality of lead wires in the multiplexer switch module, and according to a physical quantity to be measured, a corresponding lead wire is selected from the corresponding lead wires of each terminal for a measurement of the physical quantity to be measured, wherein a number of lead wires is equal to a number of physical quantities that each lead wire is used to measure;

the variable topology switch module is connected to the multiplexer switch module and the signal acquisition module, the variable topology switch module comprises a plurality of input ports, a plurality of output ports and a plurality of switches, the plurality of switches are disposed between the plurality of input ports and the plurality of output ports, and different lead wires are combined through on and off combinations of different switches, so as to implement measurements of different physical quantities;

the signal acquisition module is connected to the data processing module, and is configured to convert a signal from the variable topology switch module into a digital signal;

the data processing module is connected to the control module, and is configured to analyze the digital signal from the signal acquisition module and transmit an analyzed result to a controller;

the controller is respectively connected to the multiplexer switch module and the variable topology switch module, and is configured to control on and off of each switch in the multiplexer switch module and the variable topology switch module; and for a physical quantity P to be measured, the controller first determines the terminals A, B, . . . , I, . . . , N corresponding to the physical quantity to be measured on the metamorphic sensor, then determines and selects a lead wire IP, which measures a physical quantity P, connected to the terminal I in the multiplexer switch module, and finally determines and controls on and off of different switches in the variable topology switch module, thereby implementing combinations of lead wires AP, BP, . . . , IP, . . . , obtaining a signal of the physical quantity P to be measured at an output terminal of the variable topology switch module, and transmitting the signal of the physical quantity P to be measured to the controller through the signal acquisition module and the data processing module, so as to implement a measurement of the physical quantity P to be measured.

8. The sensor signal acquisition system according to claim 7, wherein the controller is further connected to the signal acquisition module and is configured to adjust gain and filter functions in the signal acquisition module, so that an acquired signal is clear and readable; in the multiplexer switch module, a plurality of lead wires corresponding to each terminal are disposed on a multiplexer, a corresponding lead wire for measurement is selected through on and off of switches in the multiplexer, a number of multiplexers is equal to a number of terminals of the metamorphic sensor, input ports in the variable topology switch module correspond one-to-one with the multiplexers, each input port comprises m sub-ports, where m is a number of lead wires in the multiplexer corresponding to the input port; the signal acquisition module comprises a signal processing unit and a signal conversion unit, wherein the signal processing unit is configured to amplify, filter, and compensate a signal from the variable topology switch module, so as to obtain a processed signal, and the signal conversion unit is configured to convert the processed signal to obtain a digital signal, and transmit the digital signal to the data processing module; the signal acquisition module further comprises a measurement unit, the measurement unit is one or more combinations of single-wire measurement, double-wire measurement, and multi-wire measurement; and the switch in the variable topology module is a multiplexer switch, single pole single throw switch, single pole double throw switch, single pole multi throw switch, or double pole double throw switch.

9. A multi-modal field-programmable metamorphic sensor having a multi-layer structure, wherein the multi-layer structure comprises an upper electrode layer, a spacer layer, and a lower electrode layer, at least one of the upper electrode layer and the lower electrode layer is a sensor A, the spacer layer is disposed between the electrode layers, a sensor B is formed through forming a structure of electrode layer-spacer layer-electrode layer structure, when detecting an object under test, measurement of different physical quantities of different objects is implemented through switching between the sensor A and the sensor B; in addition, the metamorphic sensor serves as a single cell, and a plurality of single cells are combined to form a multi-cell sensor, wherein the metamorphic sensor further comprises a bottom flexible film, a conductive electrode, and a top flexible film, the upper electrode layer serves as a top electrode, the lower electrode layer serves as a bottom electrode, and the spacer layer is an intermediate dielectric layer, wherein the bottom electrode is a flat electrode, disposed on the bottom flexible substrate, a plurality of high and low flexible protrusions are disposed on the intermediate dielectric layer, the top electrode comprises two flat electrodes, each parallel electrode is disposed with a lead wire, terminals of the lead wires on the two flat electrodes are relatively disposed to form a notch, the conductive electrode is disposed on the flexible protrusions, and is disposed right under the notch, when the conductive electrode is not embedded in the notch, the two flat electrodes on the top electrode form a capacitance, when the capacitance changes due to an external environment, a change in the external environment is reflected through measuring a change in the capacitance between the two flat electrodes; and when the top flexible substrate is subjected to a downward external force, the top electrode moves downward, the conductive electrode is embedded in the notch, and the two flat electrodes are conducted to form resistance, when the external environment causes the resistance to change, the change in the external environment is reflected through measuring the change in the resistance, at the same time, when the two flat electrodes are conducted to form the resistance, the entire top electrode serves as a flat electrode, the top electrode and the bottom electrode form a parallel-plate capacitor, and when the change in the external environment causes the capacitance between the top electrode and the bottom electrode to change, the change in the external environment is reflected through measuring the change in the capacitance between the top electrode and the bottom electrode.

10. A multi-modal field-programmable metamorphic sensor according to claim 9, wherein the metamorphic sensor further comprises a substrate and a piezoelectric layer, the substrate is disposed below the piezoelectric layer, and is a carrier of the piezoelectric layer, the piezoelectric layer is disposed below the bottom flexible substrate, and comprises a piezoelectric material layer and an electrode layer, the piezoelectric material layer is configured to sense pressure and convert the sensed pressure into electric charge, the electrode layer is configured to transmit the electric charge, the electrode layer is disposed with two sets of orthogonal interdigital transducers, each set of orthogonal interdigital transducers comprises a pair of lateral interdigital transducers and a pair of longitudinal interdigital transducers.

11. A multi-modal field-programmable metamorphic sensor according to claim 9, wherein a material of the bottom flexible substrate is preferably polydimethylsiloxane (PDMS) or platinum-catalyzed silicone rubber Ecoflex, a material of the bottom electrode is preferably Cu or Au, a material of the intermediate dielectric layer is preferably PDMS or platinum-catalyzed silicone rubber Ecoflex, a material of the conductive electrode layer is preferably conductive silver paste, a material of the top electrode is preferably Cu or Au, and a material of the top flexible substrate is preferably PDMS or platinum-catalyzed silicone rubber Ecoflex;

a thickness of the bottom flexible substrate is preferably 10 μm to 20 μm, a thickness of the bottom electrode is preferably 200 nm to 400 nm, a thickness of the intermediate dielectric layer is preferably 60 μm to 80 μm, a thickness of the conductive electrode layer is preferably 200 nm to 400 nm, a thickness of the top electrode is preferably 200 nm to 400 nm, and a thickness of the top flexible substrate is preferably 10 μm to 20 μm; and the lead wires on the parallel electrodes are in a spiral shape, the two spiral lead wires on the two parallel electrodes are staggered, and through the staggered arrangement of the two lead wires, lengths of the lead wires are increased, thereby increasing a sensitivity of temperature measurement.

12. A sensor signal acquisition system based on a variable topology switching matrix, wherein the acquisition system comprises the multi-modal field-programmable metamorphic sensor according to claim 6, a control module, a multiplexer switch module, a variable topology switch module, a signal acquisition module, and a data processing module, wherein the multiplexer switch module is connected to the metamorphic sensor, each terminal on the metamorphic sensor corresponds to a plurality of lead wires in the multiplexer switch module, and according to a physical quantity to be measured, a corresponding lead wire is selected from the corresponding lead wires of each terminal for a measurement of the physical quantity to be measured, wherein a number of lead wires is equal to a number of physical quantities that each lead wire is used to measure;

the variable topology switch module is connected to the multiplexer switch module and the signal acquisition module, the variable topology switch module comprises a plurality of input ports, a plurality of output ports and a plurality of switches, the plurality of switches are disposed between the plurality of input ports and the plurality of output ports, and different lead wires are combined through on and off combinations of different switches, so as to implement measurements of different physical quantities;

the signal acquisition module is connected to the data processing module, and is configured to convert a signal from the variable topology switch module into a digital signal;

the data processing module is connected to the control module, and is configured to analyze the digital signal from the signal acquisition module and transmit an analyzed result to a controller;

the controller is respectively connected to the multiplexer switch module and the variable topology switch module, and is configured to control on and off of each switch in the multiplexer switch module and the variable topology switch module; and for a physical quantity P to be measured, the controller first determines the terminals A, B, . . . , I, . . . , N corresponding to the physical quantity to be measured on the metamorphic sensor, then determines and selects a lead wire IP, which measures a physical quantity P, connected to the terminal I in the multiplexer switch module, and finally determines and controls on and off of different switches in the variable topology switch module, thereby implementing combinations of lead wires AP, BP, . . . , IP, . . . , obtaining a signal of the physical quantity P to be measured at an output terminal of the variable topology switch module, and transmitting the signal of the physical quantity P to be measured to the controller through the signal acquisition module and the data processing module, so as to implement a measurement of the physical quantity P to be measured.

13. The sensor signal acquisition system according to claim 12, wherein the controller is further connected to the signal acquisition module and is configured to adjust gain and filter functions in the signal acquisition module, so that an acquired signal is clear and readable; in the multiplexer switch module, a plurality of lead wires corresponding to each terminal are disposed on a multiplexer, a corresponding lead wire for measurement is selected through on and off of switches in the multiplexer, a number of multiplexers is equal to a number of terminals of the metamorphic sensor, input ports in the variable topology switch module correspond one-to-one with the multiplexers, each input port comprises m sub-ports, where m is a number of lead wires in the multiplexer corresponding to the input port; the signal acquisition module comprises a signal processing unit and a signal conversion unit, wherein the signal processing unit is configured to amplify, filter, and compensate a signal from the variable topology switch module, so as to obtain a processed signal, and the signal conversion unit is configured to convert the processed signal to obtain a digital signal, and transmit the digital signal to the data processing module; the signal acquisition module further comprises a measurement unit, the measurement unit is one or more combinations of single-wire measurement, double-wire measurement, and multi-wire measurement; and the switch in the variable topology module is a multiplexer switch, single pole single throw switch, single pole double throw switch, single pole multi throw switch, or double pole double throw switch.

\* \* \* \* \*